March 28, 1967  H. F. AMBOS ET AL  3,310,832
APPARATUS FOR PROCESSING SHRIMP
Filed Dec. 17, 1964  14 Sheets-Sheet 6
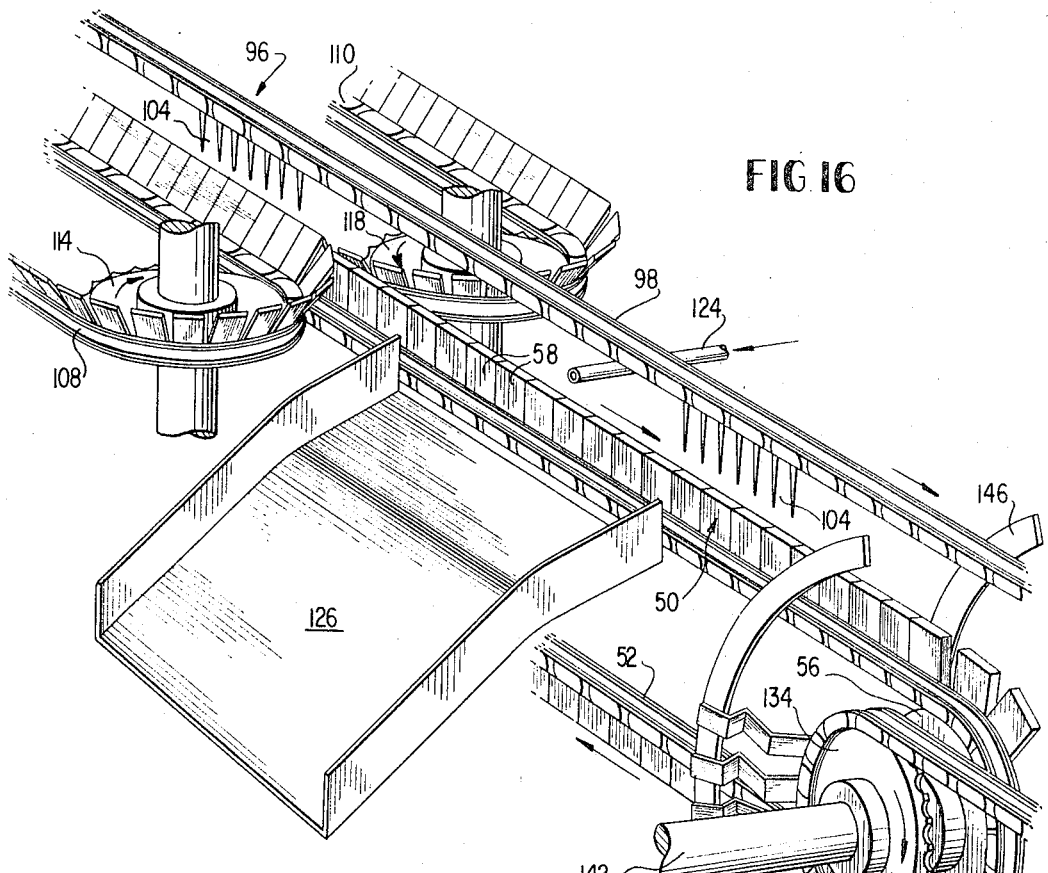
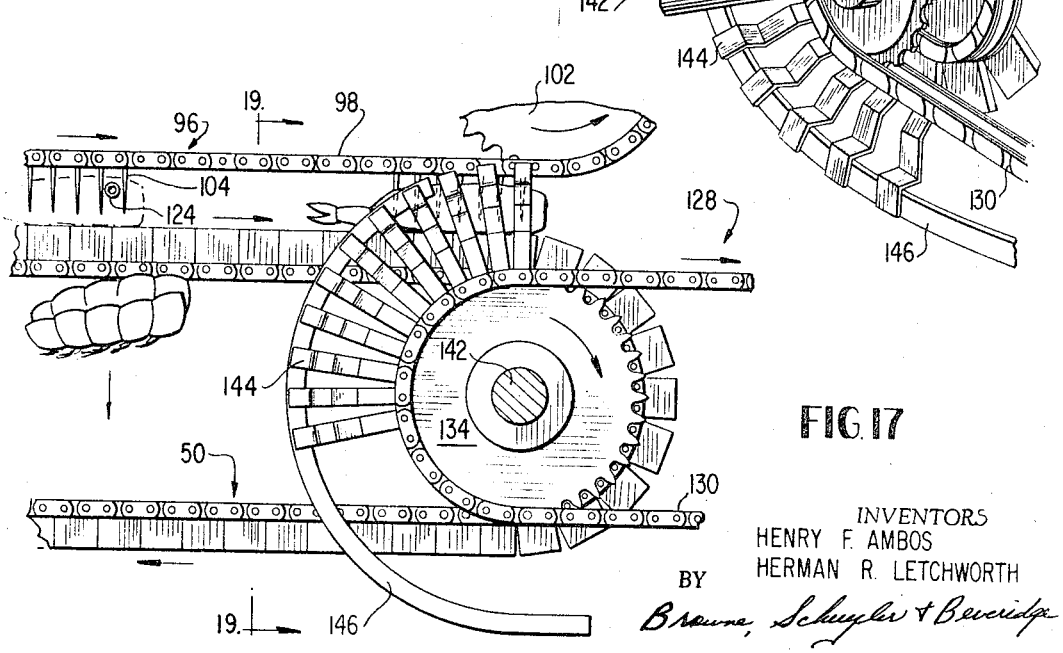
INVENTORS
HENRY F. AMBOS
HERMAN R. LETCHWORTH
BY
Browne, Schuyler & Beveridge
ATTORNEYS

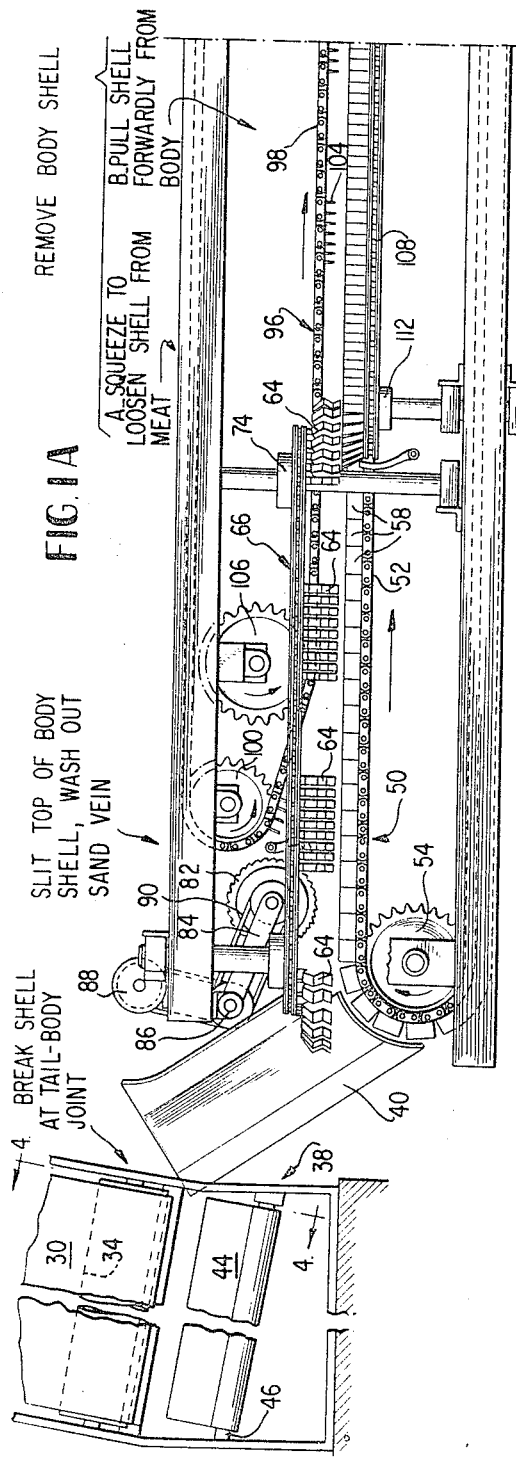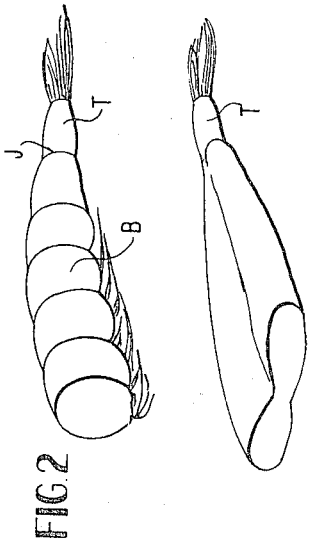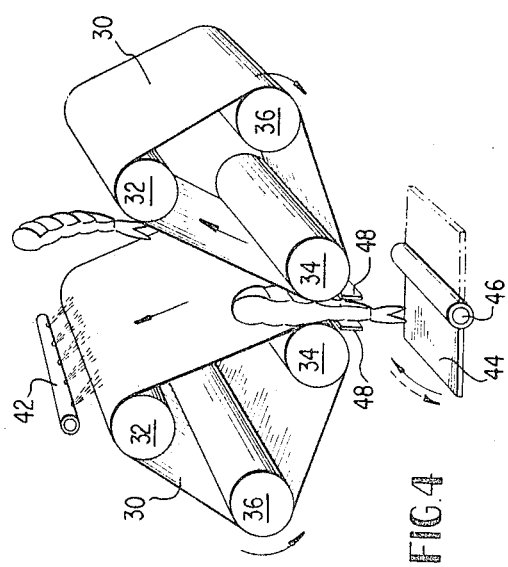

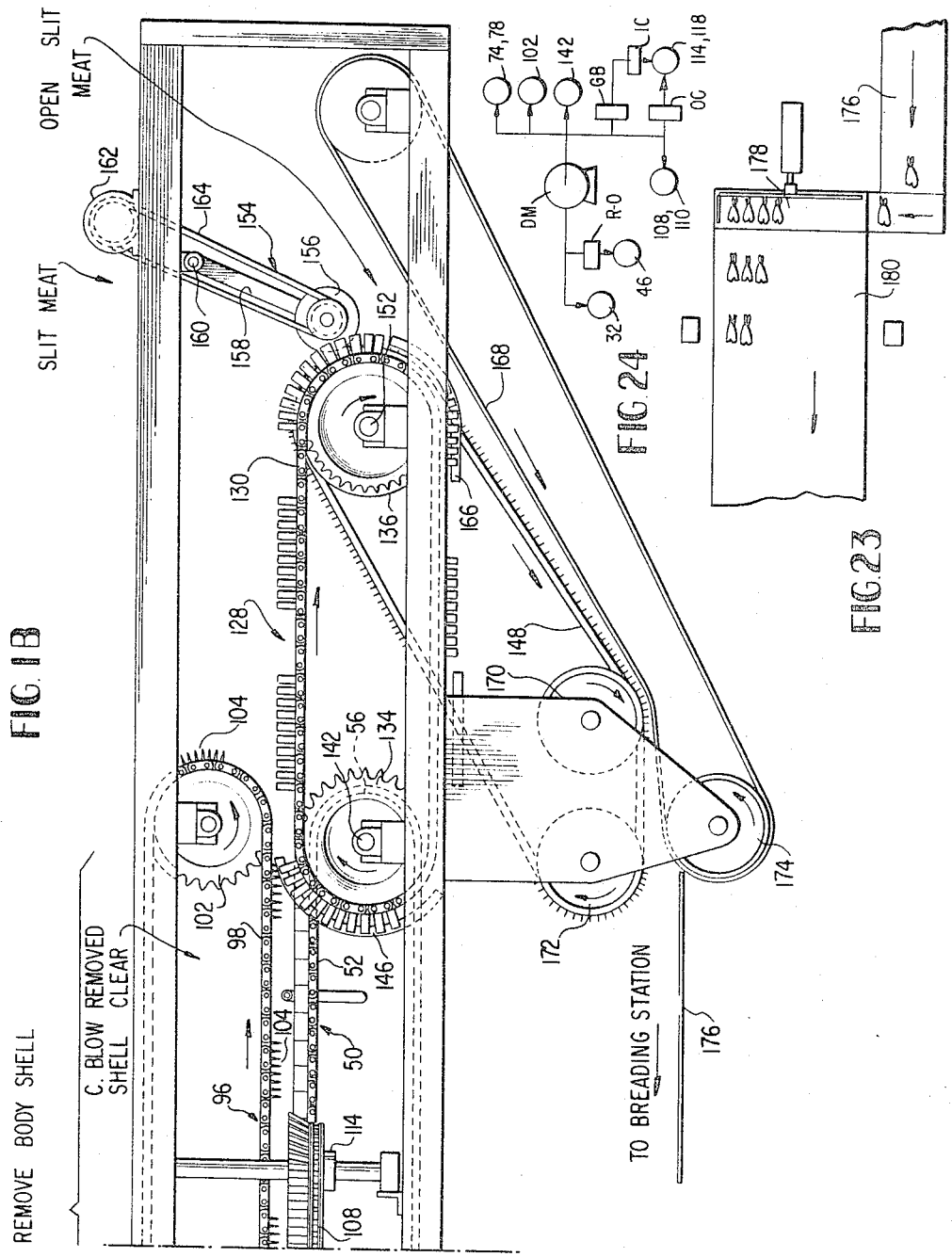

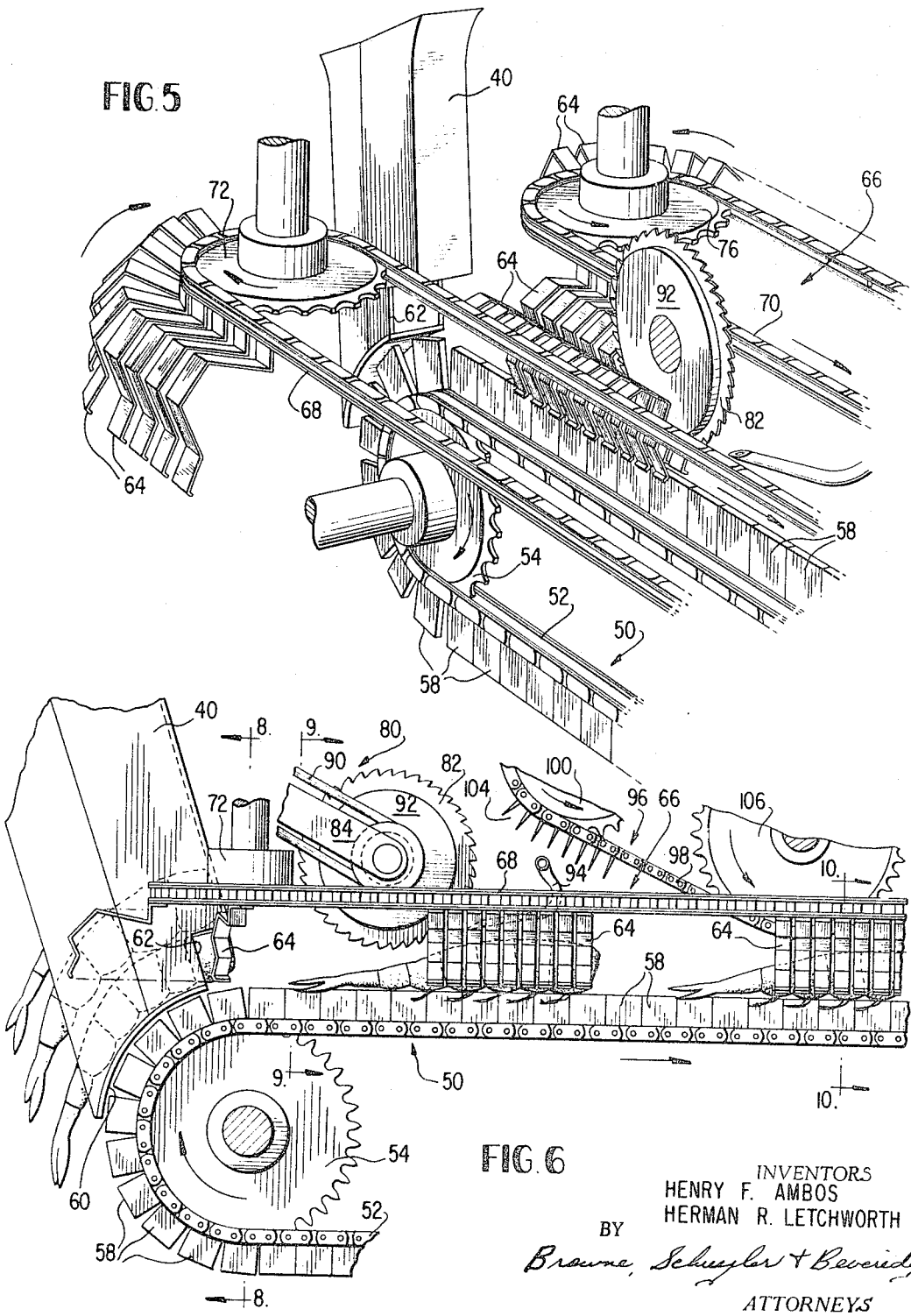

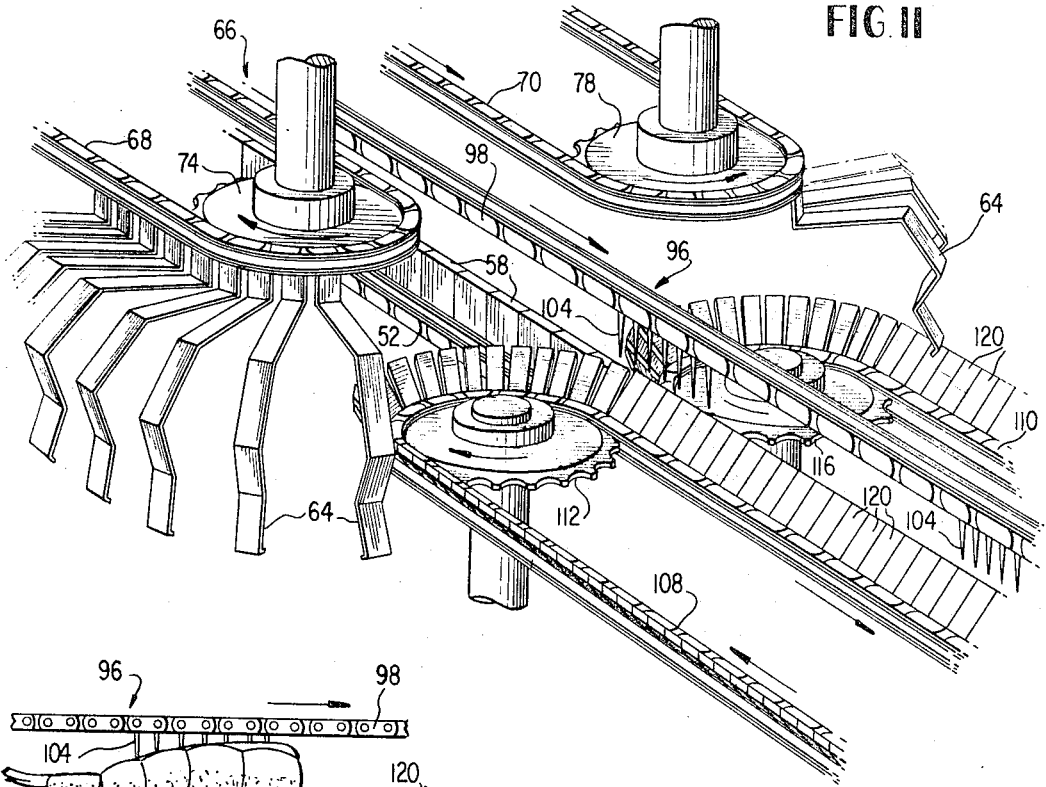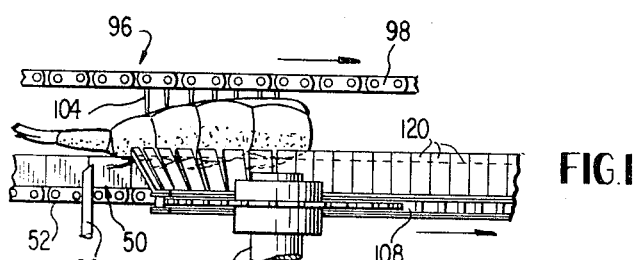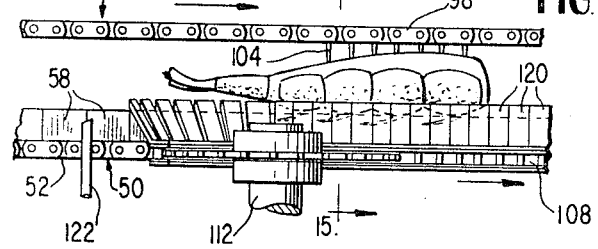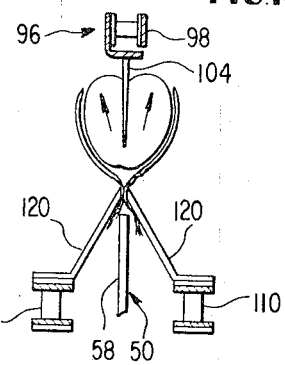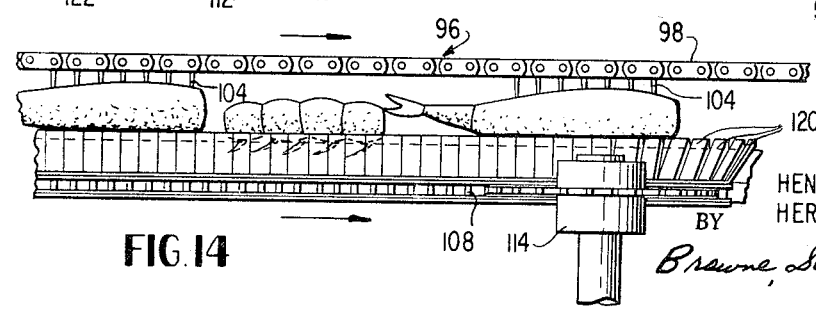

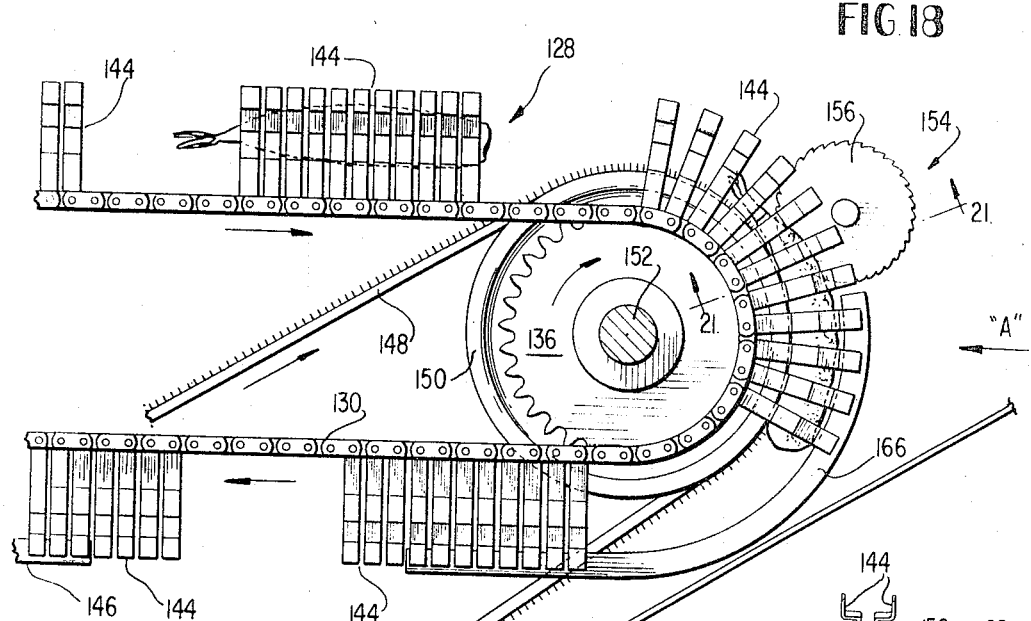
FIG.18
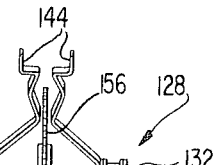
FIG.21
FIG.20
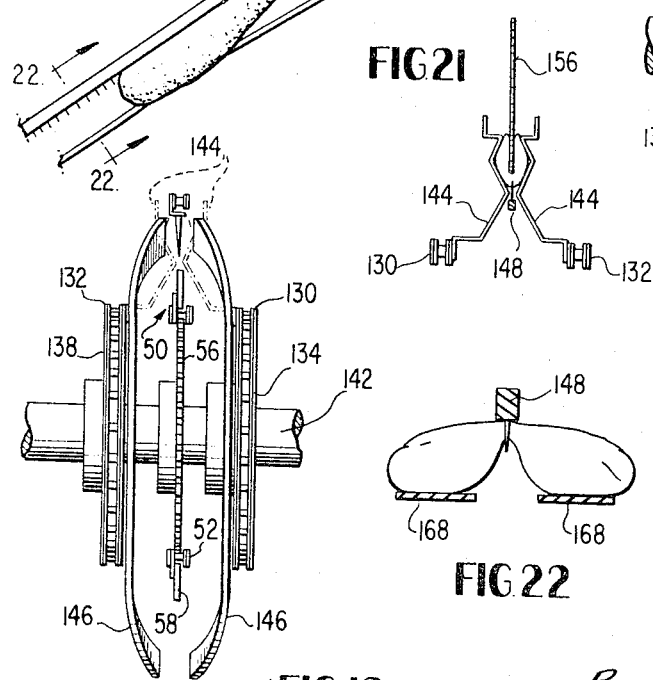
FIG.19
FIG.22
INVENTORS
HENRY F. AMBOS
HERMAN R. LETCHWORTH
BY
Browne, Schuyler & Beveridge
ATTORNEYS

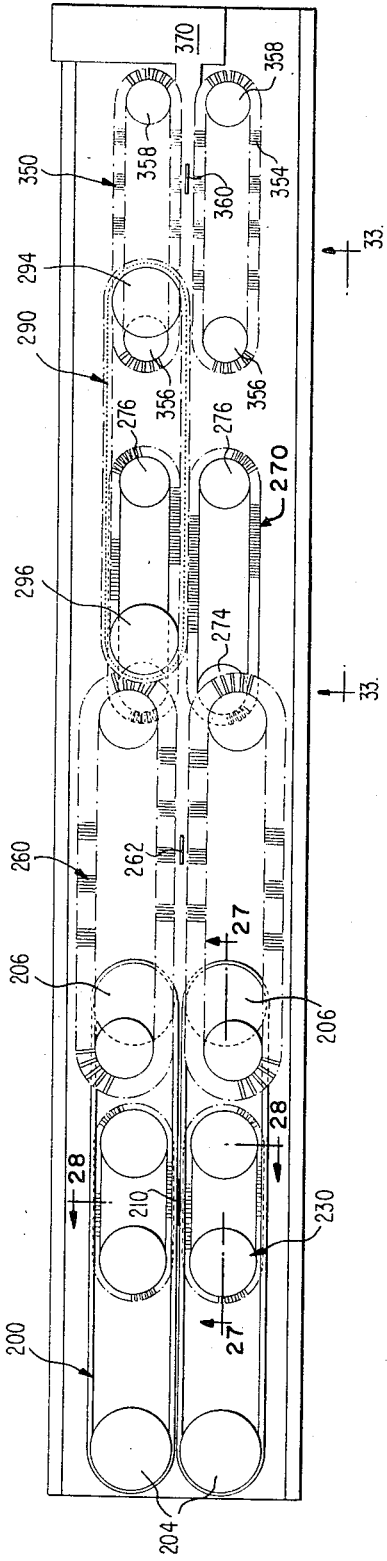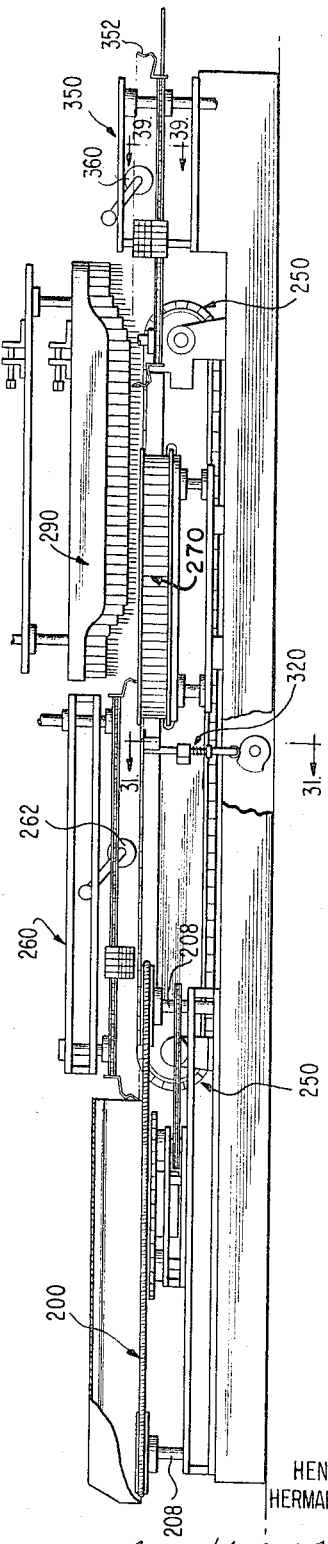

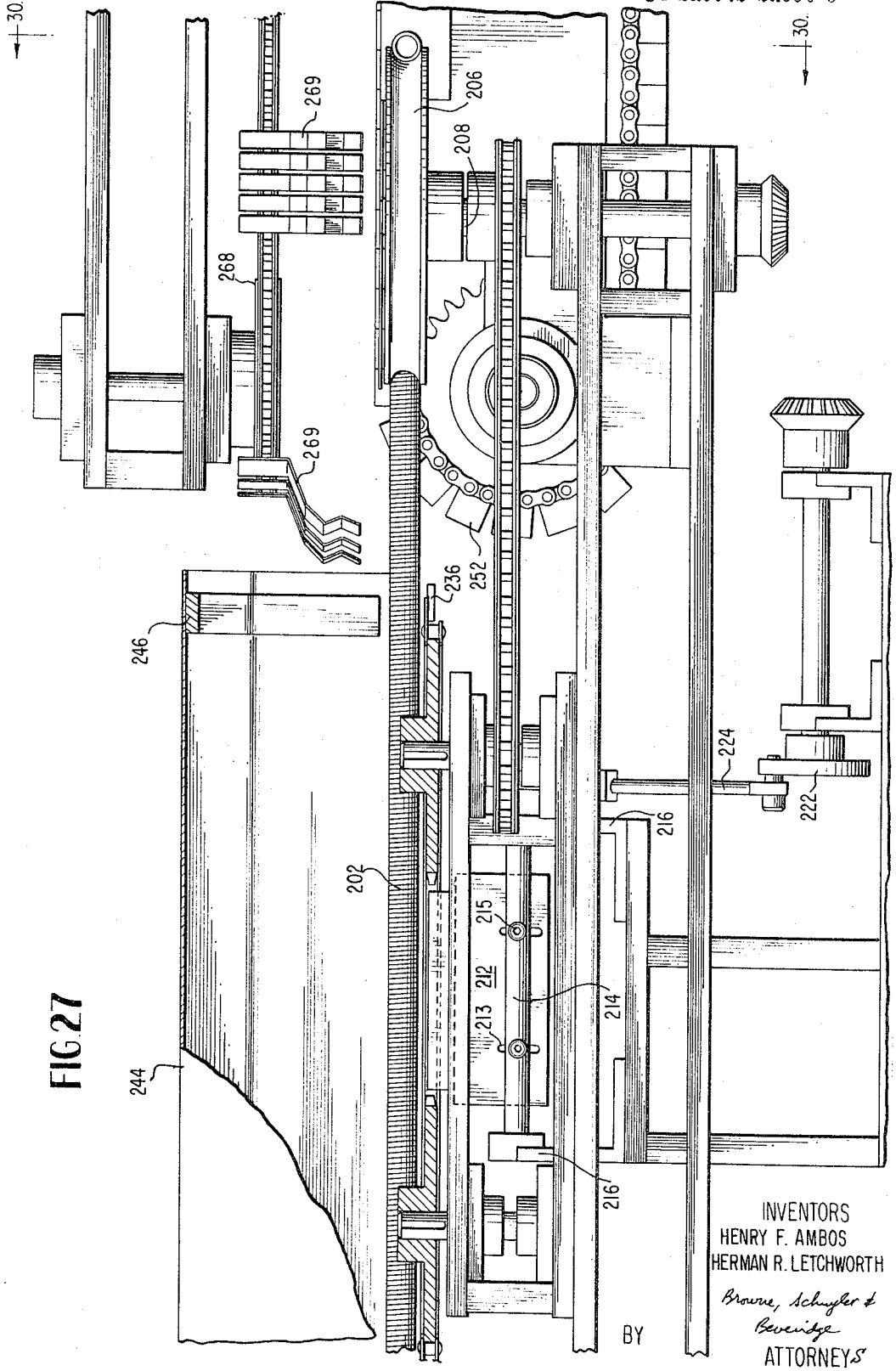

INVENTORS
HENRY F. AMBOS
HERMAN R. LETCHWORTH

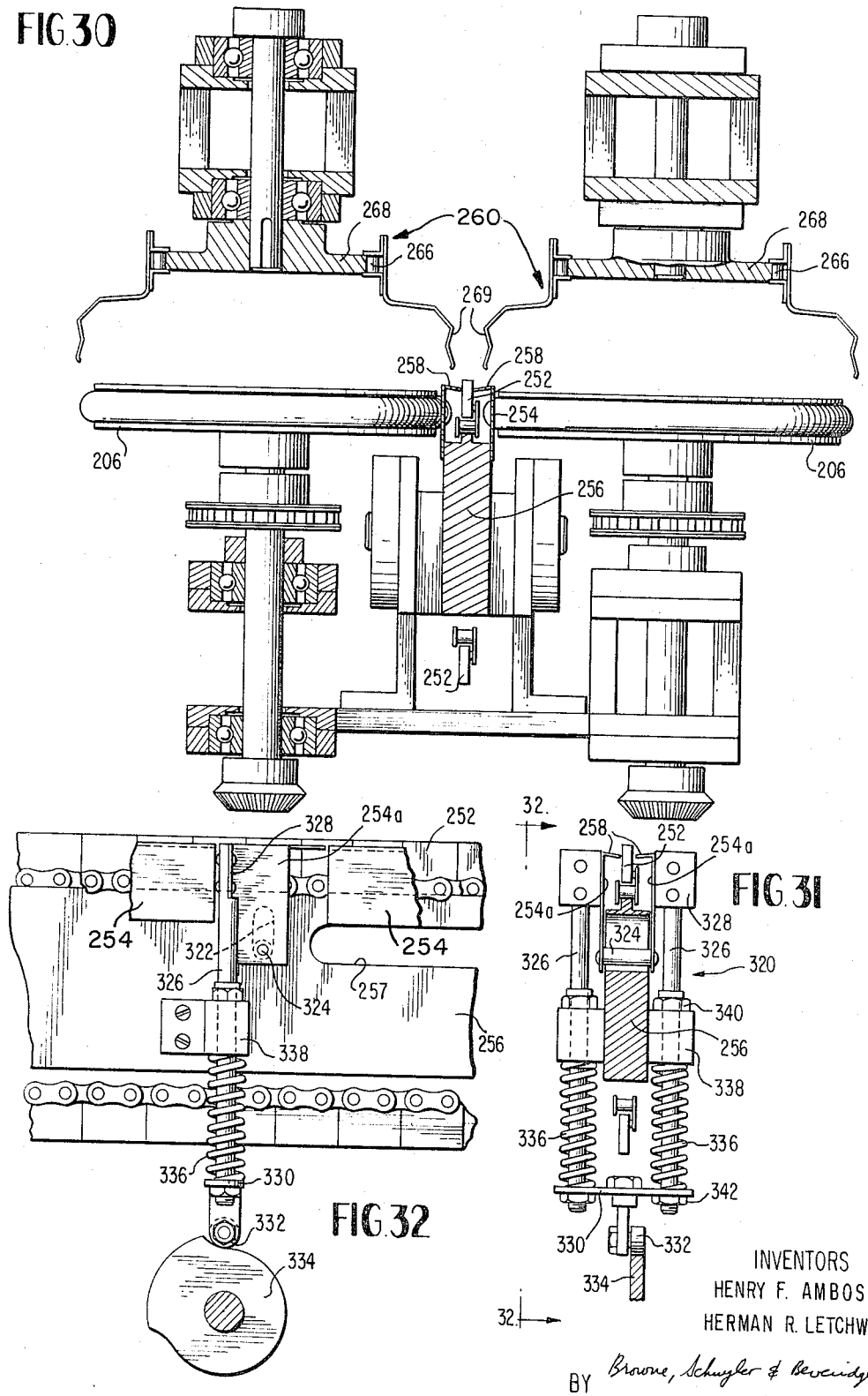

March 28, 1967

H. F. AMBOS ET AL 3,310,832

APPARATUS FOR PROCESSING SHRIMP

Filed Dec. 17, 1964

INVENTORS
HENRY F. AMBOS
HERMAN R. LETCHWORTH

BY Browne, Schuyler & Beveridge

ATTORNEYS

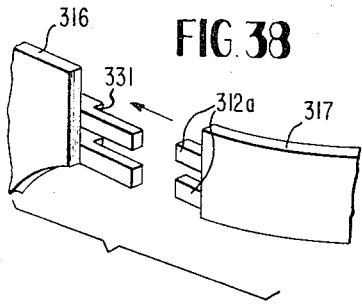
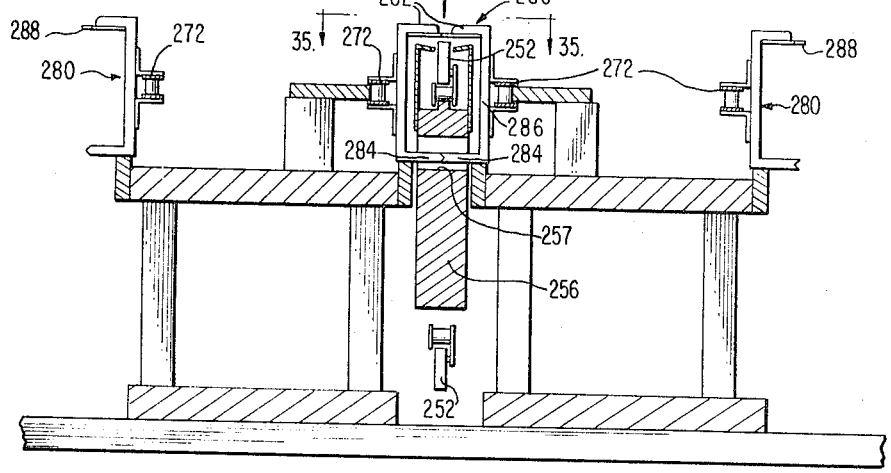
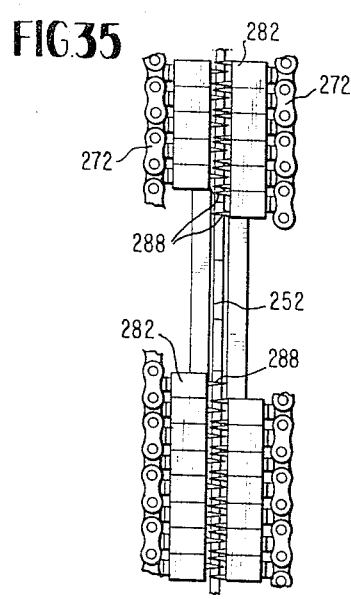
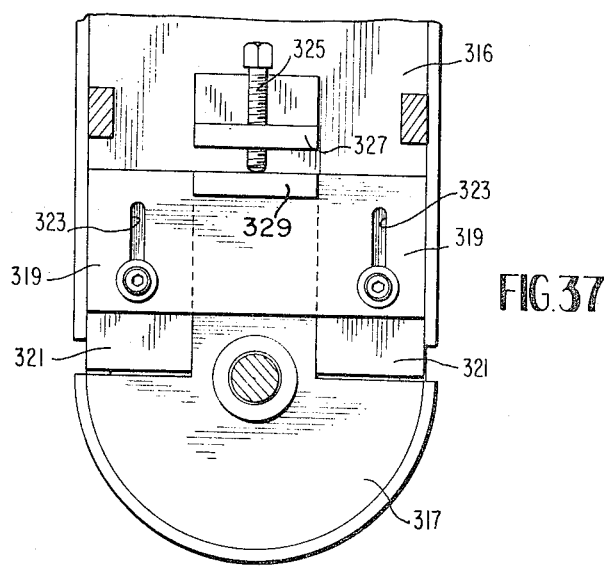
INVENTORS
HENRY F. AMBOS
HERMAN R. LETCHWORTH March 28, 1967  H. F. AMBOS ETAL  3,310,832
APPARATUS FOR PROCESSING SHRIMP
Filed Dec. 17, 1964  14 Sheets-Sheet 14
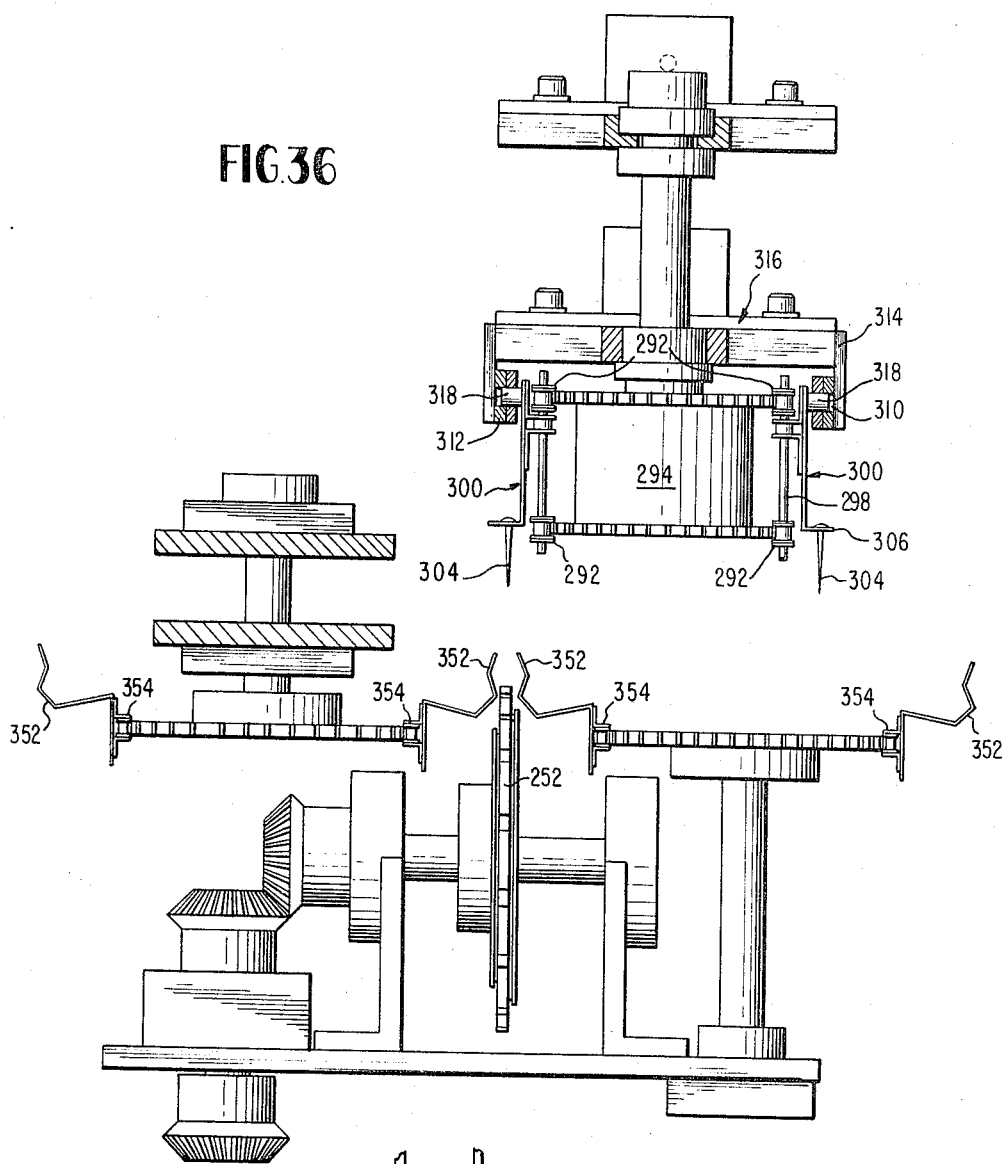
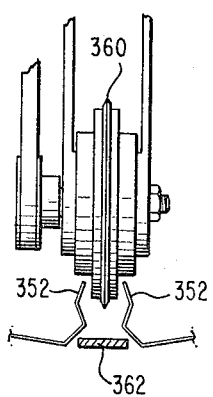
INVENTORS
HENRY F. AMBOS
HERMAN R. LETCHWORTH
BY Browne, Schuyler & Beveridge
ATTORNEYS

United States Patent Office 3,310,832
Patented Mar. 28, 1967

3,310,832
APPARATUS FOR PROCESSING SHRIMP
Henry F. Ambos and Herman R. Letchworth, Savannah, Ga., assignors to Seafoods Automation Corp., Savannah, Ga., a corporation of Delaware
Filed Dec. 17, 1964, Ser. No. 419,177
23 Claims. (Cl. 17—2)

This application is a continuation-in-part of our copending application, Ser. No. 281,957, entitled "Method for Processing Shrimp," filed May 21, 1963, now Patent No. 3,164,859.

This invention relates to apparatus for processing shrimp, and more particularly to apparatus for preparing raw, headles shrimp for frying.

The present invention is especially directed to apparatus for automatically processing or preparing headless, raw shrimp to place the shrimp on condition to be coated with a batter or breaded for a deep frying cooking operation. In preparing shrimp in this manner, it is necessary to remove that portion of the shrimp body shell located forwardly of the tail of the shrimp, to remove the sand vein from the shrimp, and to split the shrimp substantially entirely through from top to bottom longitudinally so the opposite sides of the body of the shrimp may be opened out and fully coated with batter for the subsequent frying. Shrimp prepared in this manner are frequently known as "butterfly" shrimp.

In recent years, a substantial amount of development has occurred in the field of methods and apparatus for deshelling shrimp automatically. Most processes or machines presently in use are employed to prepare the shrimp for a boiling operation by separating the body of the shrimp from the head, tail and covering shell with or without removal of the so-called "sand vein" which extends longitudinally through the shrimp body slightly beneath the dorsal side of the shrimp. The conventional manner of deshelling shrimp for the foregoing purpose is to pass the shrimp through the nip of a pair of deshelling rollers which squeeze the shrimp to eject the body meat from the shell.

Preparation of shrimp for frying is a somewhat more complicated proces because it involves not only the separation of the shrimp body from its shell, but also requires the splitting of the shrimp into the so-called "butterfly" shape. A further problem is presented in that it is desired to leave the tail of the shrimp intact. Thus, the passing of the shrimp between a pair of squeezing rollers is not satisfactory in the preparation of shrimp for frying because this type of deshelling operation merely separates the body from the shell and also, in the usual case, separates the body from the tail.

Accordingly, it is a primary object of the present invention to provide apparatus for performing the method for removing the body shell of the shrimp, together with the shrimp sand vein, and splitting the shrimp in the manner described above while leaving the tail shell and tail of the shrimp intact.

A further object of the present invention is to provide a novel device for breaking the shell of the shrimp at the tail joint while leaving the tail intact.

It is another object of the invention to provide apparatus for efficiently removing from headless shrimp that portion of the shrimp shell located forwardly of the shell joint at which the shrimp body shell is joined to the shrimp tail section shell.

In the achievement of the foregoing, and other objects, headless shrimp, graded to a generally uniform size, are subjected to the following process: the shrimp shell is circumferentially broken at the joint at which the body shell is joined to the tail shell; the shrimp shell is then longitudinally slit along the top of the shrimp from the head end of the shrimp to the circumferential break; in conjunction with the slitting of the shell, the sand vein is removed from the shrimp; the shrimp is then squeezed from opposite sides of the body portion of the shell to loosen that portion of the shell from the meat; the loosened body shell section is then pulled forwardly from the head end of the shrimp, and the deshelled body of the shrimp is then split and opened out in preparation for dipping in a breading batter.

Circumferential breaking of the shrimp shell at the tail section-body section joint is accomplished by supporting the shrimp body and flexing the tail of the shrimp laterally from side to side relative to the body. The shrimp is supported from opposite sides at a location forwardly of the tail shell-body shell joint and the side to side flexing of the shrimp separates the shell joint normally joining the body and tail sections of the shell circumferentially around the body of the shrimp. The shrimp is then passed beneath a shell slitting saw having an axially projecting flange which establishes the depth of cut of the saw to a depth sufficient to expose the sand vein of the shrimp. The shrimp are conveyed longitudinally beneath the saw; the saw cuts through the dorsal center line of the shrimp to separate the body shell section along the top of the shell from the head end of the shrimp to the circumferential break in the shell accomplished in the previous step. A high pressure water jet is associated with the shell slitting saw and directed into the slit formed by the saw to wash out the exposed sand vein as the saw slits the shell and exposes the sand vein.

In one embodiment of the invention, the shrimp are then conveyed into the nip of a pair of opposed parallel chains which carry resilient squeezing fingers located to engage the shrimp body from opposite sides along the lower portion of the body. Immediately prior to the nip an upwardly directed air jet blows the tail of the shrimp upwardly clear of the opposed squeezing fingers so that the tail shell is not gripped by the fingers. The resilient fingers squeeze the shrimp and urge the body of the shrimp upwardly partially through the slit cut in the top of the body shell by the shell slitting saw. This action loosens the body shell from the body meat of the shrimp. After the shell is loosened in the foregoing manner, the gripping fingers are accelerated in a direction forwardly of the shrimp and pull the loosened body shell clear of the head end of the shrimp. The body shell is then ejected by a transversely directed air blast while the shrimp body and tail are advanced into operative relationship with a conveyer which conveys the shrimp beneath a second slitting saw. The second slitting saw splits the shrimp lengthwise substantially through from top to bottom to nearly entirely separate the two opposite sides of the body from each other. A pair of belts operatively related to the last conveyor then engage the opposite sides of the shrimp body to open the body out into a flattened or "butterfly" configuration.

From this latter operation, the shrimp are conveyed to a breading operation.

Other objects and features of the invention will become apparent by reference to the following specification and to the drawings.

In the drawings:

FIG. 1A is a side elevational view, with certain parts broken away or shown in section, of a portion of a shrimp processing machine forming one embodiment of the invention;

FIG. 1B is a side elevational view of the remaining portion of the machine and constituting a continuation of FIG. 1A;

FIG. 2 is a perspective view of a headless shrimp in the form in which the shrimp is introduced into the machine of FIGS. 1A, 1B;

FIG. 3 is a perspective view of a shrimp after the shrimp has been processed by the machine of FIGS. 1A, 1B;

FIG. 4 is a perspective view of the machine with parts to the right of the line 4—4 of FIG. 1A omitted, showing details of the shell breaking and magazine feeding apparatus;

FIG. 5 is a perspective view showing details of the shell slitting mechanism and magazine;

FIG. 6 is a side elevational view of the structure in FIG. 5 showing, in addition, details of the inter-relationship between the shell slitting operation and shell removal operation;

FIG. 11 is a perspective view showing details of that portion of the apparatus at the entrance to the shell removal station of the machine;

FIG. 12 is a partial side elevational view showing a shrimp entering the shell removal station;

FIG. 13 is a detailed side elevational view of the same portion of the machine shown in FIG. 12 showing the shrimp at a point just after entry into the shell removal station;

FIG. 14 is a side elevational view of that portion of the shell removal station immediately to the right of that portion shown in FIG. 13;

FIG. 15 is a cross-sectional view taken on the line 15—15 of FIG. 13;

FIG. 16 is a perspective view of the outlet end of the shell removal station;

FIG. 17 is a side elevational view of the right-hand end portion of FIG. 16, with the shell receiving chute omitted;

FIG. 18 is a side elevational view forming a continuation from the right-hand end of FIG. 17;

FIG. 19 is a cross-sectional view taken on the line 19—19 of FIG. 17;

FIG. 20 is an end view, partially in section, looking in the direction of the arrow A of FIG. 18;

FIG. 21 is a cross-sectional view taken on the line 21—21 of FIG. 18;

FIG. 22 is a cross-sectional view taken on the line 22—22 of FIG. 18;

FIG. 23 is a top plan view showing the manner in which shrimp processed by the machine shown in the preceding figures are conducted from the machine to a breading operation, not shown;

FIG. 24 is a schematic diagram of the drive train of the apparatus.

FIG. 25 is a schematic plan view of a shrimp processing machine representing a second embodiment of the invention;

FIG. 26 is a side elevational view of the machine of FIG. 25 with certain portions broken away and others removed;

FIG. 27 is an enlarged, fragmental cross-sectional view taken generally along lines 27—27 of FIG. 25.

FIG. 30 is a cross-sectional view taken generally along lines 30—30 of FIG. 27;

FIG. 31 is an enlarged cross-sectional view of a tail lifting device taken generally along lines 31—31 of FIG. 26;

FIG. 32 is a side view of the tail lifting device as viewed along lines 32—32 of FIG. 31;

FIG. 33 is an enlarged side elevational view of a portion of the machine as viewed generally along lines 33—33 of FIG. 25 with certain portions broken away and others removed;

FIG. 34 is a cross sectional view taken generally along lines 34—34 of FIG. 33;

FIG. 35 is a plan view of a portion of the machine as viewed generally along lines 35—35 of FIG. 34 and with certain portions removed;

FIG. 36 is a cross-sectional view taken generally along lines 36—36 of FIG. 33;

FIG. 37 is a plan view of a portion of the machine as viewed generally along lines 37—37 of FIG. 33;

FIG. 38 is an exploded perspective view of an adjustable end portion of the machine viewed in FIG. 37; and FIG. 39 is an enlarged cross-sectional view taken generally along lines 39—39 of FIG. 26.

Figure 7:
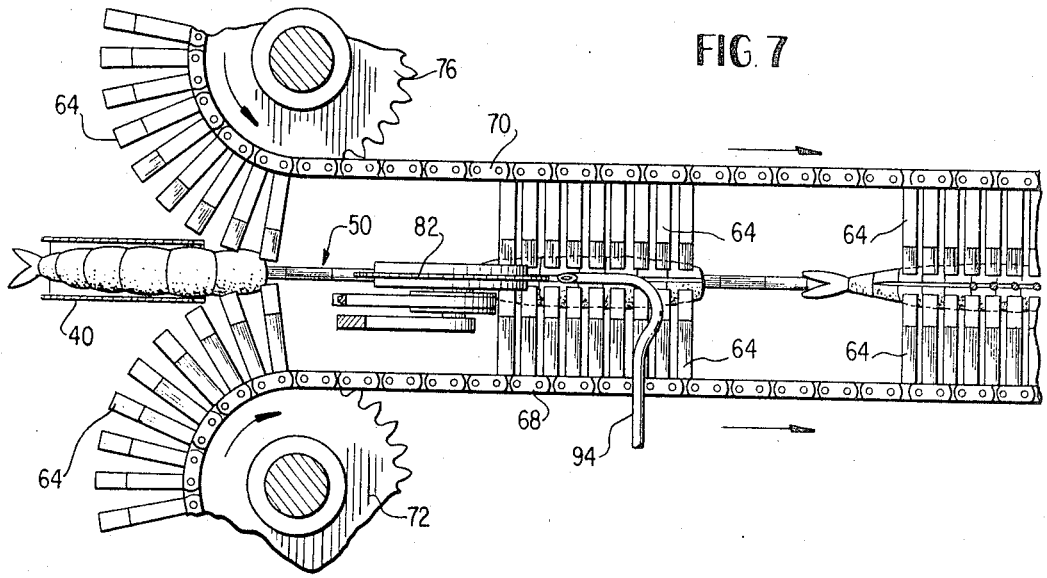
FIG. 7 is a top plan view of that portion of the machine shown in FIG. 5.

The apparatus disclosed in the drawings is especially designed to perform a process by means of which headless shrimp as shown in FIG. 2 are deshelled and split open into the form shown in FIG. 3 with the tail remaining intact. This particular process is used in preparing shrimp for frying, the shrimp in the form of FIG. 3 being conducted to a breading station and, in the usual case, being subsequently frozen and packaged.

It is believed that the apparatus as shown in the drawings will be more readily understood by first outlining the operations successively performed on the shrimp by the apparatus and to begin with, reference will be made to the embodiment of FIGS. 1A and 1B.

Prior to being introduced into the apparatus, the shrimp are graded to an approximately uniform size and their heads are removed in a conventional manner. The shrimp as fed into the machine thus have the appearance as shown in FIG. 2 with the shrimp shell intact. During their progress through the apparatus, referring to FIGS. 1A and 1B, the shrimp move from left to right (in all side, top and perspective views of the drawings) through the machine and during transit of the machine, the following steps are performed in succession on the shrimp:

I. The shell is broken at that joint J (FIG. 2) at which the tail shell section T is joined to the body shell section B. Breaking of the shell at this joint is accomplished by the structure best shown in FIG. 4 and forms a circumferential breaks so that the body shell section B is entirely separated from the tail shell section T.

II. The shrimp is then passed beneath a slitting saw (FIG. 6) which cuts a longitudinal slit through the entire length of the body shell section B to a depth such that the sand vein of the shrimp is exposed.

III. In conjunction with step II, a water jet is directed longitudinally into the slit cut by the saw to wash out the sand vien.

IV. The shrimp is then advanced into the nip (FIG. 11) formed by the convergence of a pair of endless chains carrying resilient gripping plates. As the shrimp is carried into the nip, the plates engage the lower portion of the body shell (FIG. 12) from opposite sides and squeeze the shrimp to urge the body meat upwardly and partially through the slit in the body shell (FIG. 13). This action loosens the body shell from the body meat.

V. The gripping plates are then accelerated forwardly to pull the loosened shell forwardly beyond the head end of the shrimp (FIG. 14).

VI. The plates are subsequently released from the shell and the stripped body shell is ejected by an air blast (FIGS. 16 and 17).

VII. The shrimp is then advanced beneath a second slitting saw (FIG. 18) which slits the shrimp lengthwise substantially entirely through from top to bottom.

VIII. The split body meat is opened out on opposite sides of the slit (FIGS. 18 and 22) into the configuration shown in FIG. 3.

In order to more clearly illustrate those portions of the mahcine directly employed in performing the process outlined above, certain elements of the stationary machine framework have been omitted, as have conventional, commercially available components of the driving mechanism, such as the power source and transmission means employed to drive various parts in synchronized rotation during operation of the machine. With the exception of mechanism for rotating the two slitting saws, all of the various shafts disclosed in the drawings are mounted for rotation about stationary axes and are rotatably mounted from the fixed frame by bearing assemblies of a conventional nature which will not be described in detail.

APPARATUS FOR CIRCUMFERENTIALLY BREAKING THE SHRIMP SHELL

With reference to the embodiment of FIGS. 1A and 1B, the apparatus for circumferentially breaking the shrimp shell is best shown in FIGS. 1A and 4. Shrimp being fed into the machine are introduced into the machine through this apparatus which, as best seen in FIG. 4, includes a pair of power driven belts 30 each trained around a set of three rollers 32, 34 and 36. Rollers 32, 34 and 36 are mounted for rotation in a suitable frame assembly designated generally 38 with all roller axes parallel to each other and inclined downwardly to the right as viewed in FIG. 1A at an angle of approximately 10 to 15 degrees below the horizontal. The runs of the respective belts 30 between rollers 32 and 34 converge downwardly toward each other and the respective rollers 34 are spaced from each other, as best seen in FIG. 4, by an amount such that a shrimp dropped tail downwardly between the two belts can pass partially through the opening between rollers 34, but is prevented from dropping entirely through the opening.

The spacing between rollers 34 is determined in accordance with the average size of shrimp being processed by the machine and is chosen to be such that the tail of the shrimp projects downwardly well beyond the lower peripheries of rollers 34.

One of each set of rollers 32, 34, 36 is driven in rotation in a direction such that the adjacent runs of the respective belts 30 are driven upwardly from their respective rollers 34 to their respective rollers 32. This direction of movement of the belts, combined with the inclination of the roller axes, feeds shrimp dropped into the nip between the rollers 34 downwardly toward the right, as viewed in FIG. 1A into the mouth of a shrimp receiving magazine 40. The surfaces of belts 30 are preferably exposed to a continuous water spray indicated at 42.

Shrimp are introduced into the apparatus of FIG. 4 by manually dropping them tail downward and feet facing in the direction of downward inclination of the roller axes. As previously stated, and as shown in FIG. 4, the tails of the shrimp hang downwardly clear below rollers 34 and project into the path of movement of a shell breaking plate 44 which is mounted for pivotal oscillation through an arc of approximately 180° about an axis defined by a pivot shaft 46 rotatably journalled in frame 38. Plate 44 is continuously pivotally oscillated between the full line and dotted line positions indicated in FIG. 4, the arc of pivotal oscillation being above the horizontal.

The pivotal oscillation of plate 44 causes the plate to strike the downwardly projecting tail of the shrimp supported between belts 30 and to flex the tail of the shrimp from side to side. A pair of spaced parallel stationary guide bars 48 are mounted in frame 38 immediately below the respective rollers 34 at a location such that the guide bars engage the respective sides of the shrimp at a location somewhat forwardly of the tail shell-body shell-joint J (FIG. 2) to limit sidewise movement of the body. As the shrimp is driven by belts 30 toward the observer between rollers 34 as viewed in FIG. 4 (downwardly toward the right in FIG. 1A), the tail section of the shrimp is struck several times by plate 44 and flexed relative to the body of the shrimp sufficiently such that the shrimp shell is circumferentially broken or separated at the joint J.

In this particular step, it is desired to break only the shrimp shell so that the tail and tail shell of the shrimp remain attached to the shrimp body meat, but are completely separated from the body shell. In order to accomplish this, the pivotal axis of plate 44 is disposed in parallel relationship with the axes of roller 34 and the radial extent of the plate is such that at its closest approach to guide bars 48, plate 44 is spaced from the guide bars by at least the approximate thickness of the shrimp at the tail shell-body shell joint.

Referring now to FIG. 1A, the shrimp are fed by belts 30 into the mouth of an inclined magazine 40, with the shrimp oriented in a feet downward, head foremost (to the right as viewed in FIG. 1A) position. The shrimp are stacked one on top of each other within magazine 40 in the fashion best shown in FIG. 6 and are removed in spaced succession from the lower end of the magazine to advance to the shell slitting station.

SHELL SLITTING AND SAND VEIN REMOVAL APPARATUS

Details of the apparatus employed for longitudinally slitting the body shell and removing the sand vein are best seen in FIGS. 5 through 10 inclusive.

As best seen in FIG. 6, shrimp deposited in magazine 40 by belts 30 are stacked one on top of each other, feet down and with the head end of the shrimp facing forward with respect to the direction of movement of the upper or operative run of a support conveyor designated generally 50. Support conveyor 50 includes an endless chain 52 trained around end sprockets 54 and 56 (FIG. 1B). The links of chain 52 each carry a support plate 58, the plates 58 abutting each other along the horizontal runs of chain 52 to provide a continuous supporting surface extending longitudinally underneath shrimp being conveyed through the apparatus between magazine 40 and the outlet end of the shell removal station.

Magazine 40 is constructed with a bottom wall 60 which is curved and disposed closely adjacent the path of movement of support plates 58 about end sprocket 54. The side and front walls of magazine 40 are cut open at their lower ends as at 62 so that the head end of the lowermost shrimp in magazine 40 is exposed in a position to be gripped between opposed spring finger sets 64 of a shell slitting conveyer assembly designated generally 66.

Conveyer 66 includes a pair of endless chains 68 and 70 respectively, chain 68 being trained around end sprocket 72 and 74, while chain 70 is trained around respective end sprockets 76 and 78. End sprockets 72 and 76 are driven in rotation at the same speed, but in opposite directions so that the adjacent runs of chains 68 and 70 move parallel to each other in the same direction —that is, from left to right as viewed in FIG. 7. Each chain 68 and 70 carries a plurality of sets of spring fingers 64, the sets of spring fingers 64 being spaced from each other so that a set of fingers 64 on chain 68 is disposed in opposed relationship to a set of fingers 64 on chain 70 as the two chains pass along the opposed portions of their path.

Figure 8:
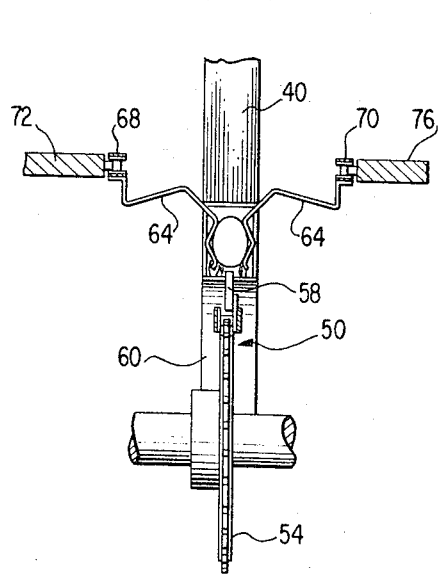
FIG. 8 is a cross-sectional view taken on the line 8—8 of FIG. 6.

The spacing between the opposed sets of fingers 64 on chains 68 and 70 is such that as the spring fingers on the respective chains move around their respective sprockets 72 and 76, the head end of the lowermost shrimp in magazine 40 is gripped resiliently between the fingers 64 on the respective chains and is pulled from magazine 40 onto the support plates 58 of support conveyer 50 in the fashion best seen in FIGS. 7 and 8. Chains 68 and 70 are driven at the same speed as is support conveyer 50. Thus, as the shrimp move from left to right as viewed in FIGS. 6 or 7, support plates 58, spring fingers 64, and the shrimp gripped between the spring fingers all move as a unit.

After being withdrawn from magazine 40 by spring fingers 64, the shrimp is conveyed beneath a high speed shell slitting saw assembly designated generally 80 which includes a circular saw 82 mounted for rotation in a vertical plane which also includes the general plane of movement of support plates 58. Saw 82 is mounted for rotation at the end of an arm 84 which is pivoted from the machine frame as at 86 so that the saw may pivot in a vertical plane about pivot 86. A motor 88 mounted on the machine frame is coupled to drive saw 82 in rotation by means of a belt and pulley drive designated generally 90.

Figure 9:
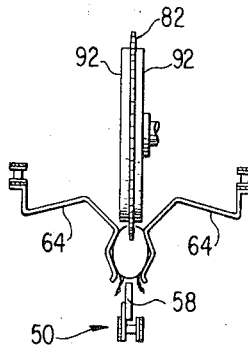
FIG. 9 is a cross-sectional view taken on the line 9—9 of FIG. 6.
Figure 10:
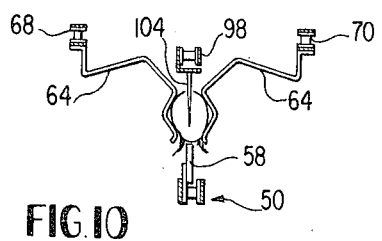
FIG. 10 is a cross-sectional view taken on the line 10—10 of FIG. 6.

On the opposite sides of saw 82, a circular plate or flange 92 projects axially from the saw, the peripheral edges of plates 92 riding on top of the shrimp to regulate the depth of cut of saw 82. As best seen in FIG. 9, as the shrimp is carried beneath saw 82, the saw longitudinally slits the shrimp to a depth determined by the radial projection of saw 82 beyond the peripheral edges of plates 92. The slit made by saw 82 extends longitudinally along the top of the shrimp from its head end at least to the circumferential break in the shrimp shell previously made by plate 44. A suitable mechanical limit stop, not shown, limits the downward movement of saw 82 so that the slit formed by the saw does not extend the entire length of the shrimp. The depth of cut determined by plates 92 is selected to be such that in addition to slitting entirely through the top of the shrimp body shell B, the slit extends downwardly into the dorsal side of the shrimp to a depth sufficient to expose the sand vein of the shrimp.

In conjunction with the slitting of the shell and exposure of the sand vein by saw 82, the sand vein is flushed from the slit by a high speed water jet projected from a nozzle 94 which is located to direct a jet of water into the slit as it is cut by saw 82. As best seen in FIG. 9, the configuration of spring fingers 64 is such that the dorsal side of the shrimp is fully exposed and no interference occurs between spring fingers 64 and saw 82.

BODY SHELL REMOVAL APPARATUS

After passing beneath the shell slitting saw assembly 80, shrimp are conveyed by spring fingers 64 into operative relationship with a pin conveyor designated generally 96. Pin conveyer 96 includes an endless chain 98 which is trained about end sprockets 100 and 102 supported in the machine frame for rotation about horizontal axes. Chain 98 includes a plurality of sets of pins 104 which are mounted on chain 98 in a spaced relationship corresponding to the spacing of the sets of spring fingers 64 on chains 68 and 70. Chain 98 is disposed in vertical alignment with chain 50 of support conveyor 52 and in addition to passing around end sprockets 100 and 102, is engaged by an idler sprocket 106 by means of which chain 98 moves into operative relationship with support conveyor 50 by passing along a downwardly inclined path from sprocket 100 to sprocket 106 and then passing on to a horizontal run uniformly spaced above support plates 58 of support conveyer 50, this horizontal run extending from idler sprocket 106 to end sprocket 104.

Referring now to FIG. 6, chain 98 is driven at the same speed as support conveyor 50 and spring finger carrying chains 68 and 70 and in a direction such that the lower run of chain 98 moves from left to right—i.e., in the same direction as do the adjacent runs of chains 52, 68 and 70. Chain 98 is synchronized with chains 68 and 70 so that as a set of pins 104 approach the periphery of idler sprocket 106, a shrimp supported by opposed sets of spring fingers 64 likewise approaches sprocket 106. As the shrimp is advanced forwardly beneath sprocket 106, the set of pins 104 on chain 98 are driven downwardly into the meat of the shrimp body, passing through the slit formed in the body shell by slitting saw assembly 80. The spacing between support plates 58 of support conveyer 50 and the lower run of chain 98 is such that pins 104 are firmly seated in the shrimp body meat in the relationship shown most clearly in FIG. 10.

Shortly after a set of pins 104 is seated in the body meat of the shrimp in the foregoing manner, the shrimp passes beyond end sprockets 74 and 78 of the spring finger carrying chains 68 and 70 and spring fingers 64 move out of engagement with the sides of the shrimp as the shrimp passes beyond sprockets 74 and 78. Movement of the shrimp through the machine is now accomplished by pin conveyer 96 and the shrimp continues to advance to the right at the same speed.

Referring now to FIGS. 11 through 15, as spring fingers 64 move away from the sides of the shrimp, the shrimp is advanced by pin conveyer 96 into the nip of a pair of shell removal chains 108 and 110 which are respectively trained around end sprockets 112, 114 and end sprockets 116, 118. Each of chains 108 and 110 carries a continuous array of resilient squeezing or gripping plates 120, the plates 120 being carried on individual links of the chains and inclined upwardly and outwardly from their respective chains in the manner best seen in FIG. 15. The relationship of the squeezing plates on the respective chains 108 and 110 to each other and to support plates 58 of support conveyer 52 is likewise best illustrated in FIG. 15, the inclination of the plates 120 on the respective chains being such that their upper edges would be in resilient contact with each other in the absence of a shrimp disposed between plates 120 on the respective chains.

During the seating of pins 104 in the body meat of the shrimp, the shrimp is forced downwardly onto the upper edges of support plates 58 and the relationship between plates 120 and support plates 58 is such that as the shrimp begins to move between end sprockets 112 and 116 into the converging nip of squeezing plates 120 on chains 108 and 110, the plates 120 move into squeezing relationship with the sides of the shrimp along the lower portion of the body of the shrimp. As the shrimp moves further into the nip, the meat of the shrimp is squeezed upwardly, partially through the slit in the shrimp shell and more firmly onto pins 104, this action being shown in FIG. 12.

In order to prevent the tail of the shrimp from being gripped between the opposed squeeze plates 120, an air jet 122 is located closely adjacent one side of support conveyer 50 just prior to the nip between squeezing chains 108 and 110. An upwardly directed blast of air from jet 122 blows the tail of the shrimp upwardly to a position clear above the nip, and as the shrimp is advanced completely into the nip, the tail of the shrimp is located above the squeezing grip of opposed plates 120 in the fashion best seen in FIG. 13.

Chains 108 and 110 are continuously driven so that their opposed runs, adjacent support conveyer 50, move in the same direction as does the adjacent run of support conveyer 50. Normally, chains 108 and 110 are driven at the same speed as the support conveyer. However, in order to strip the body shell from the shrimp, chains 108 and 110 are simultaneously intermittently accelerated so that a point in time after the shell is firmly gripped between opposed squeeze plates 120 and the body shell has been completely loosened as in FIGS. 13 and 15, the gripped shell is stripped forwardly beyond the head end of the shrimp as in FIG. 14. The intermittent acceleration of chains 108 and 110 is synchronized with the movement of pin conveyer 96 so that the acceleration occurs at a time when the shell is fully gripped by squeeze plates 120—i.e., at a point of time after the shrimp has been advanced beyond sprockets 112 and 116. The spacing between adjacent sets of pins 104 on pin conveyer 96 is such that, as best seen in FIG. 14, a space between adjacent shrimp is provided sufficient to accommodate the stripped shell.

After the shrimp shell has been stripped from beyond the head end of the shrimp as in FIG. 14, the shell passes beyond end sprockets 114 and 118 and is blown clear of support conveyer 50 by an air blast from a nozzle 124 located just beyond end sprockets 114 and 118. A shell receiving chute 126 may be located opposite nozzle 124 to receive the discarded body shell of the shrimp.

MEAT SLITTING AND OPENING APPARATUS

Referring now to FIGS. 16 and 17, after the shelled shrimp is carried beyond nozzle 124 by pin conveyer 96, it is moved into engagement with a second spring finger conveyer assembly designated generally 128. Conveyer 128 includes a pair of chains 130 and 132 respectively trained around end sprockets 134, 136 and sprockets 138, 140. End sprockets 134 and 138 are commonly mounted upon a shaft 142 which also carries end sprocket 56 of support conveyor 50.

Like chains 68 and 70, chains 130 and 132 each carry a plurality of sets of spring fingers 144, the sets of fingers 144 on the respective chains being uniformly spaced and disposed in opposed relationship with each other. By virtue of the direct connection between end sprockets 134 and 138 and end sprocket 56 of the support conveyer 50, movement of spring fingers 144 is synchronized with the movement of shrimp along pin conveyer 96 so that as the shrimp approach the outlet end pin conveyer 96 a set of spring fingers 144 moves into gripping relationship with the sides of the shrimp as shown in FIG. 17.

Because support conveyer 50 moves out of engagement with the shrimp as spring fingers 144 grip the shrimp, the spring fingers 144 must provide the entire support for the shrimp during its transit along the upper run of chains 130, 132 between the respective end sprockets of the chain. Thus, the fingers 144 are constructed to firmly grip the shrimp from opposite sides and because of the relatively firm bias applied to the fingers, finger opening cams 146 are suitably mounted upon the machine frame to open the spring fingers to permit the shrimp to be moved between the fingers by pin conveyer 96, the cams 146 terminating somewhat in advance of pin conveyer end sprocket 102 so that the fingers firmly grip the sides of the shrimp to retain the shrimp as the pins 104 are withdrawn from the shrimp as chain 98 moves upwardly about the periphery of its end sprocket 102.

The shrimp are gripped between spring fingers 144 and carried to the right as viewed in FIG. 17 and, referring now to FIG. 18, further to the right until a pin studded belt 148 moves into engagement with the lower side of the shrimp. Belt 148 is an endless belt which is trained about a pulley 150 which is mounted upon the same rotary shaft 152 which carries end sprockets 136 and 140 of the spring finger carrying chains.

The shrimp body moves into engagement with the outer periphery of pulley 150, and as the shrimp body passes around the periphery of pulley 150, it passes beneath a meat slitting saw assembly designated generally 154 which includes a circular saw blade 156 mounted for rotation at the end of an arm 158 which is adjustably mounted on the machine frame as at 160. Saw 156 is adjustably located with respect to the outer periphery of pulley 150 to determine the depth to which the meat is to be slit by saw 156. The saw blade is driven in rotation from a motor 162 by a belt and pulley coupling designated generally 164.

Saw blade 156 is spaced from the periphery of pulley 150 by a distance such that the shrimp meat is slit vertically from top to bottom to a depth approximately $\frac{1}{16}$ of an inch from the lower side of the shrimp.

As the shrimp is carried around the periphery of pulley 150 and begins to pass below the horizontal, a set of spring finger opening cams 166 engages the spring fingers 144 to urge them to their open position. The pins of pin carrying belt 148 are seated firmly in the lower side of the shrimp and serve to retain the shrimp firmly on the belt. Belt 148 then carries the shrimp into operative engagement with a pair of spreading belts 168 which engage the shrimp meat at opposite sides of the slit form by saw 156 and spread the meat from opposite sides of the slit to open out the shrimp body into the cross-sectional configuration shown in FIG. 22, the over-all appearance of the shrimp at the conclusion of the spreading operation being that shown in FIG. 3.

Referring now to FIG. 1B, as the shrimp are conveyed downwardly between the converging belts 168 and 148, the shrimp is supported from below by belts 168 and is still coupled to belt 148 by means of the pins. Belt 148 is trained around a pair of pulleys 170 and 172 and the flexting of the belt as it moves around the peripheries of these two latter pulleys is sufficient to separate the pins of belt 148 from the shrimp meat. As best seen in FIG. 1B, belts 168 pass around a lower end pulley 174 which is spaced from belt 148 at a distance such that the lower support for the shrimp body is removed just prior to the passage of belt 148 around pulley 172. The shrimp drop from belt 148 onto a suitable conveying means schematically shown at 176 and are conveyed to a breading station.

In the usual case, the conveying operation is generally similar to that schematically illustrated in FIG. 23 in which the shrimp are conveyed onto an indexing plate 178 to form a row consisting of a selected number of shrimp and the rows are indexed at intervals onto a subsequent conveyer 180 which advances the rows in spaced succession to the breading station.

For the sake of clarity, structural details of the mechanism which drives the various components of the apparatus described above have been omitted from the drawings. A schematic representation of an exemplary form of drive train is shown in FIG. 24 as including a suitable drive motor DM which may be mounted at any convenient location upon the machine frame. The output of drive motor DM is transmitted directly by any suitable power transmission means such as gearing, etc., to end sprockets 74 and 78 of shell slitting conveyor 66, to sprocket 102 of pin conveyer 96, to shaft 142, which is common to support conveyer 50 and the second spring finger conveyer 128, and to one set of pulleys, for example, pulleys 174 of the shrimp meat opening belts 168.

All of the foregoing elements are driven directly from drive motor DM at related speeds such that the various chains move at the same speed. Rotary motion of shaft 142 is transmitted through the chains of conveyer 128 to shaft 152, upon which pulley 150 of pin belt 148 is mounted so that belt 148 is also in the direct drive train described above.

Power is normally transmitted from drive motor DM to end sprockets 114, 118 of shell removal chains 108 and 110 through an overrunning clutch OC which normally drives chains 108 and 110 at the same speed as chain 98 of pin conveyer 96. End sprockets 114 and 118 are also connected to the output of drive motor DM via a second path which includes a speed increasing gear box GB and an intermittently engaged clutch IC. When clutch IC is disengaged, end sprockets 114 and 118 are driven via clutch OC at their normal speed—that is, at a speed such that chains 108, 110 move at the same velocity as does chain 98 of pin conveyer 96. When intermittent clutch IC is engaged, end sprockets 114, 118 are driven via clutch IC at a faster rate of speed, the increased rate of speed being determined by the step-up within gear box GB. Overrunning clutch OC permits the end sprockets 114, 118 to be driven at this increased speed.

Belts 30 of the shell breaking apparatus of FIG. 4 may, if desired, be driven from the same drive motor DM through a suitable power transmission such as a belt and pulley arrangement coupled to rotate rollers 34 in the desired direction at the desired speed. Shell breaking plate 44 may also be coupled to drive motor DM through a suitable power transmission which includes a mechanism operable to convert the continuous rotation of drive motor DM into rotary oscillation of plate 44.

EMBODIMENT OF FIGS. 25–39.—SHELL BREAKING

Referring now to the embodiment shown in FIGS. 25 to 39, and initially to FIGS. 25 to 29, shrimp are first conveyed to a shell breaking device generally designated 210 by a feed conveyer 200 which includes a pair of endless members shown as coil springs 202. Supporting coil springs 202 for counter movement in a horizontal plane with their adjacent runs spaced to receive shrimp therebetween are end pulleys 204 and 206 which are mounted horizontally to vertical shafts 208 for rotation thereby. Shrimp are placed in a vertical position between the adjacent spring runs by any suitable mechanical or manual means with the tail of the shrimp projecting below springs 202. In this position, shrimp are conveyed to a shell breaking device generally designated 210 with the coils of the springs serving to effectively hold the shrimp in this vertical position for conveyance and the tail breaking operation.

Shell breaking device 210 is situated below conveyer springs 202 intermediate their ends and includes a pivotable flapper or plate 212 fixed to a shaft 214 that is journalled for oscillating movement in brackets 216; the axis of shaft 214 being aligned below the linear path of movement of the shrimp as defined by conveyer springs 202. In the shown embodiment, provision for adjusting the vertical position of flapper 212 is made by the elongated slots 213 and screws 215 which are employed to attach the flapper to shaft 214 as shown in FIG. 27. Oscillation of flapper 212 may be provided by any suitable means such as the illustrated rack 218 and pinion 220 which are driven by a crank 222 through a link 224 as shown in FIG. 28.

As shrimp pass above flapper 212 their tails will be flexed laterally back and forth by flapper 212 to circumferentially break the shrimp shell between the tail and body sections of the shrimp. Firm holding of the shrimp during flexing by flapper 212 is provided by springs 202 which in effect grip the shrimp.

Figure 28:
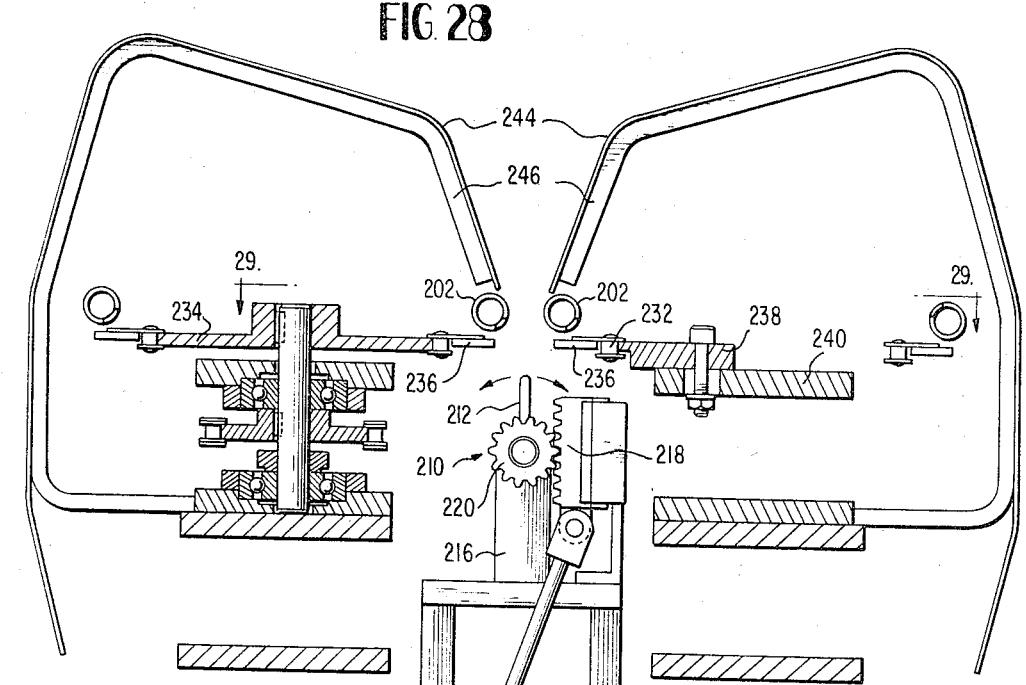
FIG. 28 is a cross-sectional view taken generally along lines 28—28 of FIG. 25 and with certain parts removed for clarity.
Figure 29:
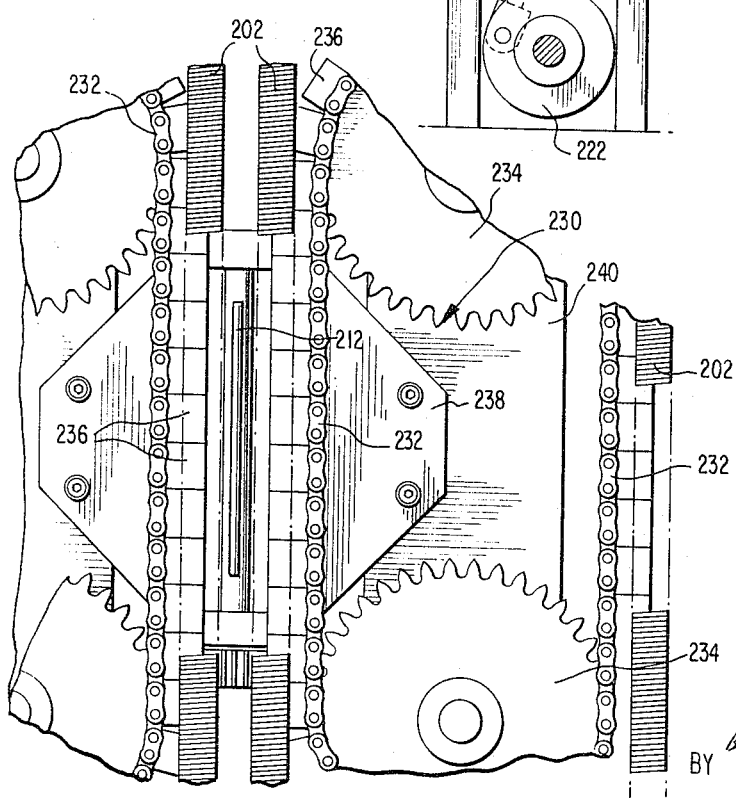
FIG. 29 is a plan view of a portion of the machine as viewed generally along lines 29—29 of FIG. 28.

Included in the preferred embodiment as illustrated in FIGS. 28 and 29, is a mechanism generally designated 230 for limiting lateral movement of the shrimp during flexing by flapper 212 as well as for providing support to conveyer springs 202. Referring to FIG. 29, this mechanism 230 includes a pair of endless chains 232 trained about end sprockets 234 for movement in a horizontal plane directly below feed conveyer springs 202. Fixed to chains 232 and projecting laterally therefrom are a plurality of abutment plates 236 which are spaced to engage the opposite sides of shrimp to limit their flexing movement. Additionally, supporting endless chins 232 and their associated abutment plates 236 in the preferred embodiment, are a pair of plates 238 which are bolted in fixed horizontal position to a suitable support structure 240 to engage the inner runs of chains 232 intermediate the ends thereof as shown in FIG. 29.

If desired, a guard may be provided for the feed conveyer 200 and in the specific embodiment this is achieved by two sheet metal enclosures 244 removably attached to frames 246 to cover the feed conveyer as shown in FIG. 28.

SHELL SLITTING

After the tail joint of the shrimp shell is broken by flapper 212, the shrimp continues in its conveyance by springs 202 to a support conveyer generally designated 250 to which the shrimp is transferred in a longitudinal or horizontal position as in the above-described embodiment with the tail trailing the head end of the shrimp and the feet or bottom of the shrimp resting on support plates 252 of support conveyer 250.

Support conveyer 250 is basically the same as that employed in the above-described embodiment of FIGS. 1A and 1B except that in the present embodiment support conveyer 250 is provided with lateral support elements which are shown in FIGS. 30 and 31 as inverted L-shaped elements 254 fixed on opposite sides of support plates 252 to an elongated stationary frame piece 256 positioned between the upper and lower runs of support conveyer 250. Lateral support elements 254 have inwardly extending flanges 258 which engage opposite sides of support plates 252 to support the same against lateral movement.

As shrimp are transferred into horizontal position on conveyer support plates 252, a conveyer generally designated 260 engages the opposite sides of the shrimp to continue forward linear movement of the shrimp to a saw 262 for slitting the shrimp shell as in the above-described embodiment of FIGS. 1A and 1B. Shell slitting conveyer 260 is generally the same as conveyer 66 of the above-described embodiment and includes a pair of endless chains 266 trained around end sprockets 268, respectively by which they are driven in counter movement along endless paths situated above opposite sides of support conveyer 250. Depending from chains 266 are spring fingers 269 which are operable in pairs to engage opposite sides of the shrimp in conveying them to saw 262. As shrimp are conveyed below saw 262 by spring fingers 269, a longitudinal slit of pre-determined depth is made in the top of the shrimp shell from the head end of the shrimp rearwardly to the joint which was previously broken by flapper 212.

SHELL REMOVAL.—GRIPPING FINGER CONVEYER

After the shrimp shells are slit the shrimp are transferred to a mechanism which longitudinally removes the slit body shell off the meat of the shrimp. Referring to FIGS. 25, 26, 34 and 35, the shell removal mechanism of the presently described embodiment includes a conveyer generally designated 270 comprised of a pair of endless chains 272 trained about end sprockets 274 and 276 for movement in a horizontal plane with adjacent runs of chains 272 situated in parallel relationship on opposite sides of the path of shrimp movement. Fixed to chains 272 are a series of gripping or squeezing fingers which are engageable with opposite sides of the shrimp shell to longitudinally remove the body shell from the meat of the shrimp as will be subsequently described in greater detail.

In the preferred form shown in FIGS. 34 and 35, the gripping fingers are metallic channel-shaped pieces 280 each including upper and lower flanges 282 and 284 interconnected by a vertical web portion 286 that is fixed intermediate its ends to one of chains 272 whereby the gripping fingers on the inner runs of chains 272 will face each other to co-operate in gripping the opposite sides of the shrimp body shells between upper flanges 282. However the shrimp tails are not engaged by gripping fingers 280 but rest on the upper gripping finger flanges 282 which are planar for this purpose. Gripping fingers 280 are arranged so their upper flanges 282 will be spaced above support plates 252 (see FIG. 34) to grip the shrimp at approximately one-quarter (¼) to five-sixteenths (5/16) of the distance from the bottom to the top of the shrimp. In this manner, effective gripping of the shrimp shell is achieved.

To accommodate lower flanges 284 of gripping fingers 280, longitudinal frame piece 256 is provided with an elongated slot 257 which receives lower flanges 284 of the gripping fingers as shown in FIG. 34.

In the preferred embodiment gripping action on opposite sides of the shrimp shell by gripping fingers 280 is increased by the provision of pointed elements or teeth on the upper flanges 282 of the gripping fingers. Referring to FIG. 35, each gripping finger flange 282 on the left hand (as viewed in FIG. 35) chain 272 has a metallic pointed element 288 fixed to its underside while each gripping finger flange 282 on the right hand chain 272 has two such pointed elements 288 fixed similarly thereto to be registrable on opposite sides of a pointed element on an opposite gripping finger.

TAIL LIFTING DEVICE

Since with the specific apparatus illustrated, the tail of the shrimp is to be retained on the final product, a device generally designated 320 herein referred to as a "tail lifting device" is employed for ensuring that the shrimp tail will not be gripped and removed by gripping fingers 280. Referring to FIGS. 26, 31 and 32, this tail lifting device 320 in the illustrated embodiment is provided by making a pair of opposite lateral support plates 254a vertically reciprocable to periodically lift the tails of the shrimp beyond the reach of gripping fingers 280 as the latter initially engage the shrimp body shell. To this end, longitudinal frame piece 256 is formed with an elongated vertical slot 322 which receives a cross pin 324 that interconnects the bottom ends of lateral support plates 254a. Lateral support plates 254a are actuated upwardly and downwardly by means of a pair of actuating rods 326 which are riveted to flange portions 328 of lateral support plates 254a respectively. The lower ends of actuating rods 326 are interconnected by cross piece 330 from which depends a suitable cam follower 332 that is engageable by rotary cam 334 to move actuating rods and their associated lateral support plates 254a upwardly.

Downward return movement of tail lifting plates 254a is provided by coil springs 336 mounted respectively on the lower portions of actuating rods 326. Upper ends of springs 336 abut against intermediate support brackets 338 which are fixed to longitudinal frame piece 256 and receive actuating rods 326. Lower ends of springs 336 abut against cross piece 330. For adjusting the stroke of the tail lifting device, the lower sections of actuating rods 326 are threaded to receive lock nuts 340 and 342 engageable with the upper and lower faces of brackets 338 and cross piece 330 respectively.

PIN CONVEYER

In order that the gripping fingers 280 may longitudinally remove the body shell from the shrimp meat, it is necessary that the shrimp meat be held separately to provide relative movement between the shell and meat. This is accomplished in the preferred embodiment by a pin conveyer generally designated 290. Referring to FIGS. 33, 34 and 36, pin conveyer 290 is comprised of a pair of endless chains 292 trained in superimposed or overlying relationship about double end sprockets 294 and 296 above and generally to one side of the path of shrimp movement as determined by gripping fingers 280. Fixed to chains 292 are a plurality of vertically disposed slide stems 298 each of which slideably receives a pin member 300. Pin members 300 in the shown embodiment each include an L-shaped hanger portion which has a pair of pins 304 depending downwardly from a lower flange 306 thereof. Intermediate the ends of each pin member 300, there is fixed a mounting sleeve 308 having a passage which receives a slide stem 298 to thereby mount pin member 300 for slideable movement along stem 298 as well as rectilinear movement together with slide stem 298 as provided by endless chains 292. Pin conveyer 290 is constructed so that the pins 304 depending from the inner run of the conveyer will be centrally positioned between gripping fingers 280 as shown in FIG. 34.

To move the pins 304 downwardly into engagement with the shrimp meat for holding the meat for removing the shell there is provided a guide or cam track 310 defined by a pair of elongated overlying rails 132 which circumvent pin members 300. In the specific form, rails 312 are fixed to side walls 314 which depend from a horizontal support structure generally designated 316 employed to rotatably support pin conveyer sprockets 294 and 296 and their shafts 295 and 297 as shown in FIGS. 33 and 36. Received in cam track 312 to be guided thereby are cam followers 318 fixed respectively to the upper ends of pin members 300.

As shown in FIG. 33, the opposite ends of cam track 310 are situated above the intermediate track portions and the track portions 310' interconnecting the intermediate and end track portions extend along a reverse curve. It will thus be seen that when pin members 300 are conveyed with chains 292 and approach the end portions of cam track 310, pin members 300 will be guided to move linearly into a raised or retracted position by the cam track portion 310, and at the right hand end of the conveyer (as viewed in FIG. 33) this retracting movement of the pin members is employed to release the shrimp meat. Subsequently as pin members 300 approach the intermediate track portions above the gripping fingers 280, pin members 300 will gradually descend in a linear fashion under the influence of cam track portion 310 to pierce into the shrimp meat for the shell removal operation. In this manner of linearly extending and retracting pins 304, improved holding and release of the shrimp meat is obtained without disturbing the condition of the shrimp or its longitudinal dimension. Moreover, in the preferred form shown, maintenance of slide stems 298 and consequently pin members 300 in the proper position above the shrimp is further ensured by guideways 303 provided along support structure side walls 314 along the inner runs of chains 292 to receive the opposite ends of slide stems 298 as shown in FIGS. 33 and 34.

In the presently described embodiment, in order to obtain relative longitudinal movement between gripping fingers 280 and pin members 300 required to longitudinally strip the shrimp shell from the shrimp meat, the gripping finger conveyer is operated at a constant speed greater than that of pin conveyer 290. A ratio of 6 to 5 between the speeds of these conveyers has been found to be satisfactory. Thus, after gripping fingers 280 engage the opposite sides of the shrimp shell as described above, pins 304 will descend into the shrimp meat whereupon the shrimp body shell will be carried with gripping fingers 280 forwardly off the shrimp meat which remains held by pins 304. Stripped shells are disposed of such as by an air jet situated at the discharge end of the gripping conveyer as in the above described embodiment of FIGS. 1A and 1B.

PIN CONVEYER SUPPORT STRUCTURE

Referring to FIGS. 33, 37 and 38, support structure 316 for the shafts 295 and 297 of the sprocket mechanism of pin conveyer 290 is constructed with an adjustable end piece 317 for adjusting the tension in chains 292 of the pin conveyer. End piece 317 is secured to the main support structure 316 by means of an offset portion 319 of end piece 317 which offset portion 319 rests on the ends 321 of main structure 316 where it is bolted through apertures (not shown) in the ends 321 of main structure 316 and elongated slots 323 formed in offset portion 319 of end piece 317.

For applying pressure to end piece 317 to increase the tension in pin conveyer chains 292, a bolt 325 is mounted by its threads to an angle iron 327 to be engageable with an upstanding portion 329 of end piece 317.

Referring to FIG. 38, the continuity of cam track 310 is maintained between end piece 317 and main support structure 316 by forming the track rails 312a on end piece 317 to be received in recesses 331 formed in the extremities of rails 312 of main structure 316.

Additionally supporting the sprocket shafts 295 and 297 of pin conveyer 299 is a second horizontal support structure 316a which is positioned in alignment above support structure 316 to which it is fixed by vertical abutments 335 as shown in FIG. 33. With the exception of cam track 310, upper support structure 316a is similarly formed with an adjustable end piece 317a. Support structures 316 and 316a are in turn supported by any suitable means such as transverse bars (not shown) which are fixed at one end to upper support structure 316a and anchored at the other end to a vertical wall (not shown) projecting upwardly from the back of the machine.

MEAT SLITTING

Referring to FIGS. 25, 26 and 33, after the shell has been stripped from the shrimp meat, a conveyer generally designated 350 operates at the same speed as pin conveyer 290 to engage the shrimp meat just prior to the release of the shrimp meat by pins 304 and to convey the shrimp meat to a rotary saw 360.

Conveyer 350 is basically the same as conveyer 128 employed in the above-described embodiment of FIGS. 1A and 1B except that spring fingers 352 of conveyer 350 are mounted on endless chains 354 which move in horizontal planes about horizontally disposed end sprockets 356 and 358 rather than the vertical arrangement employed in the above-described embodiment. In this manner, the need for finger opening cams 146 employed in the embodiment of FIGS. 1A and 1B is avoided.

Referring to FIGS. 26 and 39, saw 360 for slitting the shrimp meat is suitably mounted between the ends of conveyer 350 above the path of shrimp movement, and underlying support for the shrimp during slitting by saw 360 is provided by a rigid strip member 362 suitably fixed in stationary position to engage the bottom of the shrimp.

After the shrimp meat has been slit by saw 360, the shrimp are ultimately disposed by conveyer 350 at area 370 (see FIG. 25) where they are taken either manually or mechanically for subsequent processing such as spreading into the "butterfly" shape and then breading.

As will be apparent to persons skilled in the art, various modifications and adaptations of the structure above described will become readily apparent without departure from the spirit and scope of the invention which is defined in the appended claims.

What is claimed is:

1. Shrimp processing apparatus comprising shell slitting means for longitudinally slitting the top of a shrimp body shell from the head end of the shrimp rearwardly to the shell joint at which the shrimp body shell is joined to the shrimp tail shell, shrimp feeding means for receiving shrimp and advancing the shrimp in succession to said shell slitting means, and shell breaking means associated with said shrimp feeding means for flexing the tail of the shrimp from side to side to circumferentially break the shrimp shell at the tail shell-body shell joint before the shrimp is advanced to said slitting means.

2. Shrimp processing apparatus comprising conveying means for conveying shrimp head end foremost in spaced succession along a given path, shell slitting means mounted above said conveying means for longitudinally slitting the top of each shrimp body shell from the head end of the shrimp rearwardly to the shell joint at which the shrimp body shell is joined to the shrimp tail shell as the shrimp are conveyed along said given path by said conveying means, shrimp feeding means for receiving shrimp and feeding the shrimp to said conveying means, shell breaking means associated with said shrimp feeding means for flexing the tail of each shrimp from side to side to circumferentially break the shrimp shell at the tail shell-body shell joint before the shrimp is fed to said conveying means, and shell removal means operatively associated with said conveying means for stripping the shrimp body shell from the shrimp after the shell has been slit by said shell slitting means.

3. Shrimp processing apparatus as defined in claim 2 wherein said shell removal means comprises opposed shell gripping members movable into gripping engagement with opposite sides of a shrimp body shell as the shrimp is moved along said given path by said conveying means, and means for accelerating said shell gripping members relative to said conveying means to pull a body shell gripped by said gripping members forwardly from the head end of the shrimp.

4. Shrimp processing apparatus as defined in claim 2 wherein said conveying means comprises a support conveyer adapted to support the lower side of a shrimp as the shrimp is carried by said conveying means, opposed spring fingers engageable with opposite sides of a shrimp for supporting the shrimp on said support conveyer and movable with the shrimp to carry the shrimp from said feeding means to a point on said conveying means beyond said shell slitting means, a conveying chain carrying a plurality of sets of downwardly projecting pins extending above said support conveyer, and means guiding said conveying chain in a path wherein a plurality of pins on said chain are inserted into the body of a shrimp through the slit cut in said shrimp by said shell slitting means to support and convey the shrimp on said support conveyer into operative relationship with said shell removal means.

5. Shrimp processing apparatus comprising support means engageable with opposite sides of a shrimp at a location forwardly of the shell joint at which the shrimp tail shell section is joined to the shrimp body shell section for supporting the shrimp with the tail section of the shrimp projecting clear of said supporting means, and oscillating shell breaking means located adjacent said supporting means for flexing the projecting tail section of a shrimp supported by said supporting means from side to side to circumferentially break the shrimp shell at the aforementioned shell joint.

6. Shrimp processing apparatus comprising support means engageable with opposite sides of a shrimp at a location forwardly of the shell joint at which the shrimp tail shell section is joined to the shrimp body shell section for supporting and conveying a shrimp along a given path with the tail section of the shrimp projecting clear of said supporting means, oscillating means disposed adjacent said path for flexing the tail section of a shrimp conveyed along said path by said supporting means from side to side to circumferentially break the shrimp shell at the aforementioned shell joint, and means for receiving shrimp from said support means and slitting the top of the shrimp shell longitudinally from the head end of the shrimp to the circumferential break in the shrimp shell.

7. Shrimp processing apparatus comprising a plate mounted for pivotal oscillation about a stationary axis, support means for supporting a shrimp with the tail section of the shrimp projecting in a generally radial relationship toward said axis into the path of pivotal oscillation of said plate, and means for driving said plate in pivotal oscillation about said axis to flex the tail section of a shrimp supported by said supporting means from side to side to circumferentially break the shrimp shell at the shell joint joining the tail shell section of the shrimp to its body shell section.

8. Shrimp processing apparatus comprising a plate mounted for pivotal oscillation about a stationary axis, support means engageable with opposite sides of a shrimp at a location forwardly of the shell joint at which the shrimp tail shell section is joined to the shrimp body section for conveying a shrimp along a path extending parallel to said axis with the tail section of the shrimp projecting from said support means in a generally radial relationship toward said axis into the path of pivotal oscillation of said plate, means for driving said plate in pivotal oscillation about its axis to flex the tail section of a shrimp conveyed along said given path by said support means from side to side to circumferentially break the shrimp shell at the aforementioned shell joint, and means for receiving shrimp from said support means and longitudinally slitting through the top of the shrimp shell from the head end of the shrimp to said circumferential break.

9. Shrimp processing apparatus comprising a magazine, first conveying means for feeding shrimp in succession to said magazine and depositing the shrimp in said magazine in a head end foremost feet downward relationship, shell breaking means operable upon shrimp during transit of said first conveying means for circumferentially breaking the shrimp shell adjacent the juncture of the tail and body sections of the shrimp shell as the shrimp are conveyed toward said magazine, support means extending along a first path away from said magazine, said support means being adapted to underlie and support shrimp as shrimp are moved from said magazine along said path, second conveying means extending parallel to said support means for removing shrimp in succession from said magazine and moving shrimp in spaced succession along said path with the shrimp supported from beneath by said support means, said second conveying means conveying the shrimp in a head end foremost feet downward relationship, shell slitting means operatively located above said support means for longitudinally slitting the top of the shrimp shell from the head end of the shrimp to the circumferential break in the shrimp shell as said shrimp are conveyed along a first portion of said path, third conveying means disposed above a second portion of said path for receiving shrimp in succession from said second conveying means and conveying the shrimp upon said support means to the end of said path remote from said magazine, shell removal means associated with said third conveying means for removing that portion of the shrimp shell forwardly of the circumferential break as said shrimp are conveyed by said third conveying means, and means at the end of said support means remote from said magazine for receiving shrimp from said third conveying means and longitudinally slitting the shrimp from the top substantially entirely through the shrimp.

10. Shrimp processing apparatus comprising a magazine, first conveying means for feeding shrimp in succession to said magazine and depositing said shrimp in said magazine in a head end foremost feet downward relationship, shell breaking means operable upon shrimp during transit of said first conveying means for circumferentially breaking the shrimp shell adjacent the juncture of the tail and body sections of the shrimp shell, a support conveyor comprising an endless chain having a shrimp support run extending horizontally from a receiving end located adjacent said magazine to a discharge end at a location remote from said magazine, said chain having a plurality of thin vertically projecting support plates operable during movement along said supporting run to extend longitudinally beneath a shrimp to support the shrimp from beneath, second conveying means comprising a pair of endless chains having a pair of opposed conveying runs extending parallel to the support run of said support conveyor at symmetrically disposed locations on opposite sides of said support conveyor from said receiving end of said support conveyor to a location intermediate the ends of said support conveyor, means on the chains of said second conveyor for removing shrimp in succession from said magazine, disposing the shrimp upon the support plates of said conveyor and moving the shrimp along said support conveyor in a feet downward head end foremost relationship, a shell slitting saw operatively disposed above the support run of said support conveyor for longitudinally slitting the top of the shrimp shell from the head end of the shrimp to the circumferential break in the shrimp shell as the shrimp are conveyed by said second conveying means, third conveying means comprising a chain having a conveying run extending above said support run from a point overlying said second conveying means to the remote end of said support run, a plurality of pins on the chain of said third conveying means projecting downwardly therefrom during movement along the conveying run of said third conveying means, means for guiding the chain of said third conveying means to insert said pins downwardly into the body of the shrimp moving along said second conveying means and for carrying the shrimp along the support run of said support conveyor from said second conveying means to the remote end of said support run, and shell removal means operable upon a shrimp engaged by the pins of said third conveying means for removing that portion of the shrimp shell forwardly of the circumferential break.

11. In shrimp processing apparatus wherein shrimp are conveyed along a linear path; shell removal means for removing the shell from the shrimp body after the top of the shell has been slit longitudinally to the joint between the tail and the body of the shrimp, said shell removal means comprising a pair of endless members having adjacent runs situated on opposite sides of said path and linearly movable along said path, a number of gripping fingers fixed to said endless members and having laterally extending portions engageable with opposite sides of the shrimp shell while underlying and freely supporting the tail of the shrimp in a horizontal position, conveyor means above said path for engaging and holding the meat of the shrimp while the shell is engaged by said gripping fingers, and means for moving said endless members forwardly along said path relative to said meat holding conveyor means for longitudinally removing the shell of the shrimp from the meat of the shrimp along a straight line, wherein said meat holding conveyor means includes an endless chain situated in a horizontal plane above said path with a run of the chain generally aligned above said path, a plurality of slide stems fixed in vertical position to said chain at longitudinally spaced locations on the chain to be movable with the chain, a plurality of pin members mounted respectively for longitudinal slidable movement along said slide stems and for movement with said slide stems above said path, and guide means situated above said path engageable with said pin members for moving said pin members downwardly and upwardly along said stems into and out of engagement with the shrimp meat at longitudinally spaced locations along said path.

12. Apparatus as defined in claim 11 wherein said guide means includes a cam track co-extensive with said one run of the chain and wherein said pin members have cam followers received in said track and guided thereby.

13. In shrimp processing apparatus, a feed conveyer including a pair of endless coil springs situated in the same horizontal plane with two runs of said springs located in close parallel relationship for receiving and conveying a shrimp therebetween in a vertical position with the shrimp tail projecting below said coil springs, a pivotable flapper situated below said runs of said springs intermediate the ends thereof, and means for oscillating said flapper in a direction transverse to said springs for flexing the tail of the shrimp to break the shell of the shrimp at the joint between the tail and the body of the shrimp.

14. Apparatus as defined in claim 13 further including means for limiting angular movement of the tail of the shrimp during flexing thereof by said flapper including a pair of endless abutment members having adjacent runs situated respectively below said runs of said feed conveyer to engage and thereby limit movement of the shrimp as the shrimp is flexed by said flapper, and means for moving said endless abutment members along a path aligned generally below said coil springs.

15. Shrimp processing apparatus including a feed conveyer comprising a pair of endless members situated in the same horizontal plane with two runs of said members located in close parallel relationship for receiving a shrimp therebetween in a vertical position with the shrimp tail projecting below said endless members and conveying the shrimp along a linear path, means below said endless members intermediate the ends thereof for flexing the tail of the shrimp to break the shell of the shrimp at the joint between the tail and the body of the shrimp, a second conveyer situated in advance of said feed conveyer for receiving shrimp therefrom and conveying the same along a linear path with the shrimp extending longitudinally head end foremost, means situated above said second conveyer for slitting the shell of the shrimp longitudinally to said joint as the shrimp is conveyed by said second conveyer, and means in advance of said slitting means for longitudinally separating the body shell of the shrimp from the meat of the shrimp after the shell is slit by said slitting means.

16. Shrimp processing apparatus comprising first conveyer means for conveying shrimp in a vertical position along a linear path with the tail of the shrimp positioned below the head end of the shrimp, pivotable flapper means positioned below said conveying means for flexing the tail of the shrimp to break the shell joint of the shrimp between the tail and body sections thereof, second conveyer means for conveying shrimp head end foremost along said path after said shell joint is broken, shell slitting means mounted above said second conveyer means for longitudinally slitting the top of the shrimp body shell from the head end of the shrimp rearwardly to said shell joint as the shrimp is conveyed by said second conveyer means, shell removal means for removing the body shell of the shrimp after the shell is slit, said shell removal means including a third conveyer comprising a pair of endless members having adjacent runs situated on opposite sides of said path and movable along said path, a number of gripping fingers fixed to said endless members and having laterally extending portions engagable with opposite sides of the shrimp shell while supporting the tail of the shrimp in a generally horizontal plane, and a fourth conveyer means including an endless chain movable at a lesser speed than said endless members in a horizontal plane above said third conveyer with a run of the chain generally overlying said gripping fingers, a plurality of pins, means mounting said pins in vertical position in longitudinally spaced relationship to said chain for linear movement with said chain and for vertical longitudinal movement towards said path for engagement in the shrimp meat to hold the same while the shell is removed by said gripping fingers and away from said path for releasing said shrimp meat after the shell has been removed therefrom, and guide means for moving said pins downwardly into said shrimp meat after the shell has been engaged by said gripping fingers and for retracting the pins upwardly after the shell has been removed.

17. In shrimp processing apparatus a mechanism for holding the meat of the shrimp while the shell of the shrimp is removed, the mechanism comprising a conveyer including an endless chain situated in a horizontal plane above a path of movement of the shrimp to be held with a run of the chain generally aligned above the shrimp, a number of slide stems fixed in vertical position to said chain at a number of longitudinally spaced locations on the chain to be movable with the chain, a number of pin members mounted respectively for longitudinal slidable movement along said slide stems and for movement with said slide stems above the shrimp as governed by the associated conveyer chain, and guide means engagable with said pin members for moving said pin members downwardly and upwardly along said stems into and out of engagement with the meat of the shrimp at longitudinally spaced locations along the path of movement of the shrimp.

18. Apparatus as defined in claim 17 wherein said guide means includes a cam track co-extensive with said one run of said conveyer chain and wherein said pin members have cam followers received in said track and guided thereby.

19. In shrimp processing apparatus or the like wherein shrimp are conveyed along a linear path; shell removal means for removing the shell from the shrimp body after the top of the shell has been slit longitudinally to the joint between the tail and the body of the shrimp, said shell removal means comprising a pair of endless members having adjacent runs situated in laterally spaced relationship on opposite sides of said path and being movable with linear translation along said path, a plurality of gripping and supporting members fixed to each of said endless members to be movable therewith along opposite sides of said path, said gripping members having horizontal flange portions with pairs on opposite sides of said path being cooperable with each other for engaging opposite sides of a shrimp shell for removing the same from the shrimp body, the flange portion of the gripping members also being cooperable in pairs disposed on opposite sides of said path for supporting a tail of a shrimp in generally horizontal position, an inlet to said endless members located generally in the area where gripping fingers on the endless members move into opposite and cooperative position on opposite sides of said path, oscillatable tail lifting means situated below said path generally at said inlet for engaging the tail of a shrimp to move the tail upwardly above the reach of flange portions of the gripping members as the latter move into cooperative opposite relationship, a meat holding conveyer means for engaging and holding the meat of the shrimp while the shell is engaged by the gripping fingers, and means for moving said endless members forwardly along said path relative to said meat removing conveyer means for longitudinally removing the shell of the shrimp from the meat of the shrimp.

20. Shrimp processing apparatus defined in claim 19 wherein said tail lifting means reciprocates vertically below and above said path.

21. Shrimp processing apparatus defined in claim 20 further including cam means for reciprocating said tail lifting means.

22. Shrimp processing apparatus defined in claim 20 wherein said path is defined in part by a support conveyer having an endless conveyer member with a plurality of first support plates fixed along the endless member with the upper surfaces of said first support plates defining said path, and wherein said tail lifting means includes a plurality of second support plates reciprocable on opposite sides of said first support plates into and out of engagement with the shrimp tail.

23. Shrimp processing apparatus defined in claim 22 wherein said tail lifting means further includes a pair of actuating rods fixed with respect to said second support plates, spring means biasing the rods in vertically downward position, and cam means for raising said rods against the bias of said springs for raising said second support plates for engaging the shrimp tail to lift the same beyond the reach of the flange portions of the gripping fingers.

References Cited by the Examiner
UNITED STATES PATENTS

| | | | |
|---|---|---|---|
| 2,716,776 | 9/1955 | Streich et al. | 17—2 |
| 2,820,244 | 1/1958 | Young | 17—2 |
| 2,845,654 | 8/1958 | Deal | 17—2 |
| 3,122,777 | 3/1964 | Jonsson | 17—2 |
| 3,247,542 | 4/1966 | Johnson | 17—2 |

LUCIE H. LAUDENSLAGER, *Primary Examiner.*

SAMUEL KOREN, *Examiner.*